United States Patent
Nazarian

(10) Patent No.: US 10,697,914 B2
(45) Date of Patent: Jun. 30, 2020

(54) RAPID HIGH TEMPERATURE THERMAL ANALYSIS

(71) Applicant: ENERGY STORAGE AND RETENTION SOLUTIONS HOLDINGS, LLC, Potomac, MD (US)

(72) Inventor: Ashot Nazarian, Potomac, MD (US)

(73) Assignee: ENERGY STORAGE & RETENTION SOLUTIONS HOLDINGS, LLC, Potomac, MD (US)

(*) Notice: Subject to any disclaimer, the term of this patent is extended or adjusted under 35 U.S.C. 154(b) by 229 days.

(21) Appl. No.: 15/732,098

(22) Filed: Sep. 19, 2017

(65) Prior Publication Data
US 2018/0080888 A1     Mar. 22, 2018

Related U.S. Application Data

(60) Provisional application No. 62/495,553, filed on Sep. 19, 2016.

(51) Int. Cl.
*G01N 25/22*     (2006.01)

(52) U.S. Cl.
CPC .................... *G01N 25/22* (2013.01)

(58) Field of Classification Search
CPC .................... G01N 25/22; G01N 25/00
See application file for complete search history.

(56) References Cited

U.S. PATENT DOCUMENTS

| | | | | |
|---|---|---|---|---|
| 3,847,546 A | * | 11/1974 | Paul | G01N 30/12 436/157 |
| 5,558,790 A | * | 9/1996 | Nazarian | G01N 25/4826 219/121.77 |
| 7,033,840 B1 | * | 4/2006 | Tagge | B01L 3/50851 422/51 |
| 7,364,697 B2 | * | 4/2008 | McFarland | B01J 19/0046 250/341.1 |
| 8,292,496 B1 | * | 10/2012 | Fine | G01N 33/227 374/8 |
| 10,119,926 B2 | * | 11/2018 | Aono | G01N 30/24 |
| 2003/0162179 A1 | * | 8/2003 | Potyrailo | B01J 19/0046 506/12 |
| 2008/0017613 A1 | * | 1/2008 | Nogami | H01L 21/67069 216/58 |
| 2013/0008870 A1 | * | 1/2013 | Nogami | H01L 21/02087 216/55 |
| 2015/0037513 A1 | * | 2/2015 | Bi | C23C 16/401 427/554 |
| 2016/0252472 A1 | * | 9/2016 | Aono | G01N 30/24 374/43 |

* cited by examiner

*Primary Examiner* — Lisa M Caputo
*Assistant Examiner* — Philip L Cotey
(74) *Attorney, Agent, or Firm* — Jonathan Grant; Grant Patent Service

(57) ABSTRACT

A rapid laser device method for thermal analysis of a substance based on the laser-driven thermal reactor (RHTR) is disclosed. Substances that can be analyzed are solids, liquids, including various multiphase and multicomponent inhomogeneous substances. The RHTR measures an integrated thermal response, representing the effects of multiple thermal and chemical properties. The RHTR makes these measurements in a dynamic environment that is characteristic of real-world conditions where temperatures are changing rapidly.

11 Claims, 17 Drawing Sheets

RAPID HIGH TEMPERATURE THERMAL ANALYSIS

This application claims the benefit of U.S. Provisional Patent Application Ser. No. 62/495,553, filed Sep. 19, 2016, herein incorporated by reference in its entirety.

This disclosure relates to thermal analysis of a substance, and particularly relates to techniques for measuring.

BRIEF DESCRIPTION OF THE FIGURES

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION OF THE DISCLOSURE

A method is presented for a rapid high-temperature thermal analysis of a substance using a rapid laser thermal reactor (RHTR). Substances that can be analyzed are solids and liquids, including various multiphase and multicomponent inhomogeneous substances. The value of this technique is that there is currently no technology available that can match the RHTR's performance specifications. Unlike conventional thermal analysis techniques, which are designed to measure a selected thermal or chemical property in a nominally constant temperature environment, the RHTR measures an integrated thermal response, representing the effects of multiple thermal and chemical properties. The RHTR makes these measurements in a dynamic environment that is characteristic of real-world conditions where temperatures are changing rapidly.

The unique features of the R-ITR that surpass those of conventional thermal analysis methods are: rapid temperature sensing, programmable and rapid heating rates, quick data measurement and analysis, simple design, robustness, controllable enclosed environment, high accuracy, and the ability to analyze from milligrams up to a few grams sample quantities. For brevity, RHTR is used with respect to the invention's rapid high-temperature thermal reactor, but is not so limited just to the reactor itself. RHTR as used herein may encompass the reactor, the thermal reactor system that includes the reactor and other components that comprises the system, and/or to methods used with, in conjunction with, and in relation to the reactor.

Rapid Laser Thermal Reactor (RHTR) System Infrastructure

Figure 1:
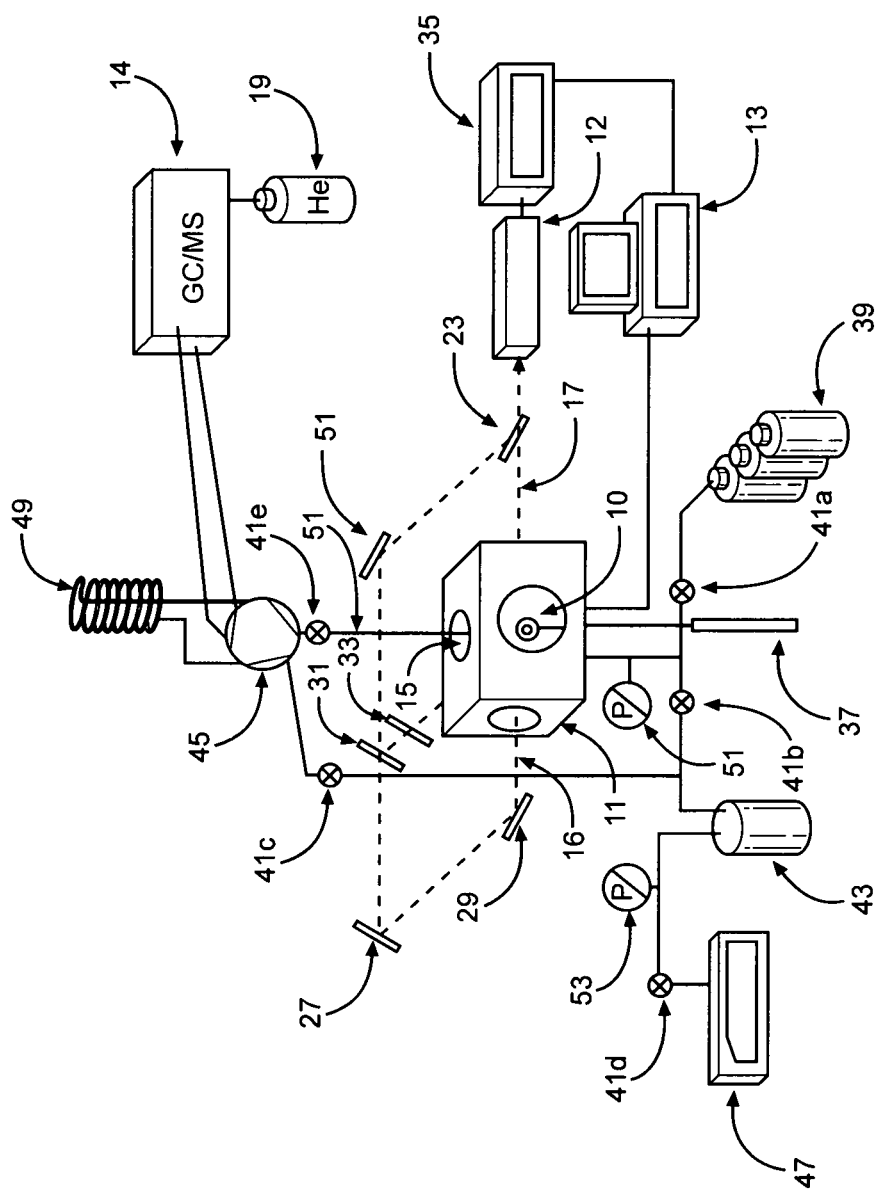
FIG. 1 is a schematic drawing of an RHTR system.
Figure 2:
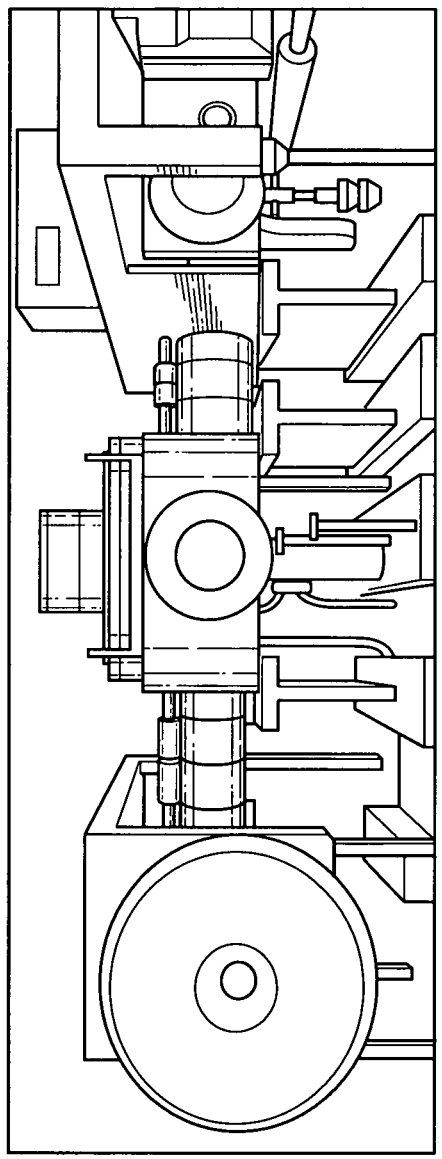
FIG. 2 is a photographic view of the RHTR system.

FIG. 1 is a schematic of an RHTR system which includes the reactor sphere, controls, optical beam delivery system, data acquisition, and gas systems. FIG. 2 shows photographic views of the RHTR system and its a) gas sampling system; b) chamber opening for sample placement; and c) a top view of the uniformly heated reactor sphere.

The RHTR system comprises reactor 10 mounted within a chamber 11. While chamber 11 is shown as a square or oblong shape in FIG. 1, and reactor 10 is sphere-shaped in FIG. 3, neither component is so limited, and the reactor and the chamber can be of any shape. The RHTR system has optical, gas supply, data acquisition, and control subsystems. As seen better in FIG. 3, at the center of reactor 30, the sample material rests on a substrate 31 that is connected to a thermocouple 33a. A second thermocouple 33b is at an inner wall of reactor 30, either attached to the inner wall or positioned close to the wall. The two thermocouples sense the temperature at their respective locations and provide data output from these two temperature sensors. Although in a one embodiment two thermocouples are used, the reactor device is not so limited. Any number of thermocouples, or other type of temperature sensors, can be used and they can be positioned anywhere desired to detect temperatures during the thermal analysis process.

Referring to FIG. 1, reactor 10 is positioned in the center of a 5 liter chamber 11 with five viewing ports, one on each of the four sides and one on the top, and a manually operated linear traverse 37 to enable reactor accessibility. Liner traverse is for sample-reactor access. It moves up and down when the chamber is opened. Only three of the viewing ports are visible in the drawing of FIG. 1. A top opening 15 of the chamber provides access to the reactor and is sealed with an o-ring. Each viewing port includes a vacuum-sealed 76 mm diameter quartz window, which is suitable for the transmission of laser beams to the reactor. Special glass with high temperature and transparency ratings are used in laser transparent port windows, as known in the art. Transparent glass ceramics such as ALON and spinel, also armor windows and chromium doped ceramics are some types suitable for laser transparent windows. Chamber 11 is a vacuum chamber and allows for control of the environment (e.g., degree of a vacuum, humidity, gas pressure, gas composition) that surrounds the sample.

Figure 2C:
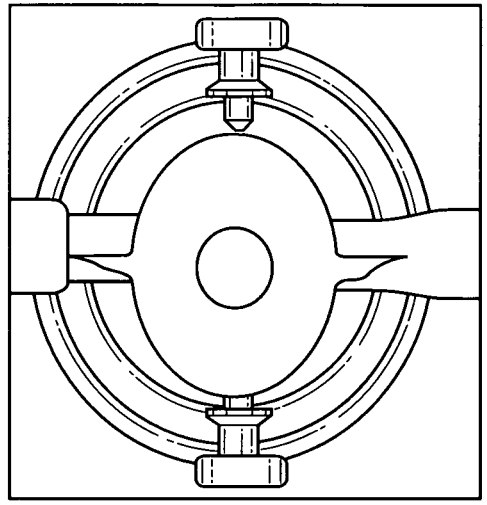
FIG. 2c is a top photographic view of the uniformly heated reactor sphere.
Figure 2B:
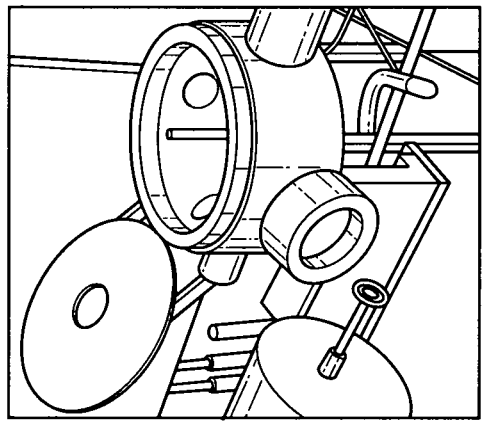
FIG. 2b is a photographic view of the chamber opening for sample placement.
Figure 2A:
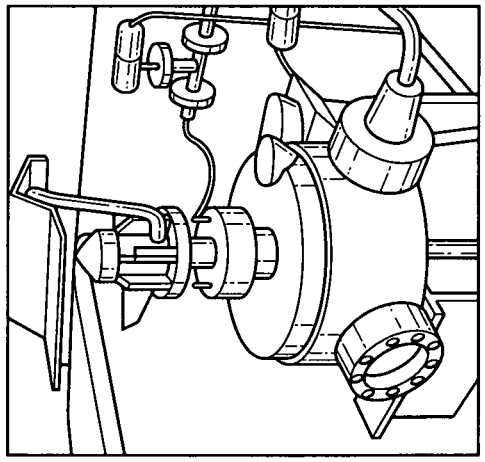
FIG. 2a is a photographic view of the RHTR gas sampling system.

The infrared laser beam heats the reactor from opposing sides 16, 17 using beam splitters that transmit and reflect equally the incident light, and concomitant optics, to achieve a uniform temperature in the measurement volume. FIG. 2c shows the top view image of the uniformly heated reactor. Laser heating allows for higher heating rates, direct reactor heating to the sample to eliminate convective heating of the surrounding gases, and measurement of the total heat loss (including both gas conductive and thermal radiative contributions) with direct sample heating.

Laser 12 is the source of the laser beams. Laser 12, in one embodiment, is an infrared, 250 W continuous-wave Nd:YAG laser, operating at a wavelength of 1.064 µm. The multi-mode laser provides a nearly uniform intensity distribution instead of the single-mode Gaussian transverse intensity distribution, and thus the effects of the laser beam intensity distribution are ignored.

A data acquisition system 13 receives as inputs measurement data from reactor 10 and chamber 11. Data acquisition system 13 records and processes this information for the specified thermophysical information of interest. Data acquisition system 13 includes a processor, such as a computer or a microprocessor, and in one embodiment a monitor and/or a printer and the like, for conducting the necessary processing of data including that outputted from the reactor and the chamber, and providing a suitable interface for viewing the data, such as plotting graphs so to produce readable outputs in whatever format is desired. Additional information on the sample's chemistry can be obtained from extractive sampling of the reaction gases, and introduction of these gases into a gas chromatography/mass spectroscopy (GC/MS) system 14. In FIG. 1 for illustrative purposes, a canister of helium (He) 19 is shown as the gas used with the GC/MS system, Note that herein "substance" and "sample" are at times used interchangeably with it understood that the substance or material under test, when a piece thereof is put into the reactor, is also known as the "sample" or "substance" under test.

The RHTR device in FIG. 1 uses a mirror laser beam delivery system in which laser 12 outputs a laser beam 21 indicated by the dashed lines. A beam splitter splits the laser beam equally in terms of power into two laser beams, with one outputted laser beam from beam splitter 23 directed to chamber 11 as a first heating laser beam to heat the reactor. The second of the two outputted laser beams from beam splitter 23 is routed as a similar beam directed to chamber 11 as a second heating laser beam to heat the reactor, with the routing being made by reflections off of a first mirror 25, a second mirror 27 and a third mirror 29. In another embodiment, a second beam splitter 31 can be positioned opposed to a side of the square/oblong chamber illustrated in FIG. 1 for splitting the laser beam again to create a third laser beam directed to chamber 11 as a third heating laser beam to the reactor. If it is desired to apply a stop to this beam, i.e. not use the third beam, then a beam stop 33 can be inserted in the line of sight of the third beam. The beam stop can be operated either manually or electronically.

While FIG. 1 illustrates a mirror reflection assembly used in the laser beam delivery system, another embodiment uses, instead of mirrors, a direct fiber optic cable connected at one cable end to the output of laser 12 and the other cable end connected to a cable attachment area on chamber 11 or reactor 12. The use of fiber optic cable instead of the mirror assembly gives a direct, continuous and uninterrupted routing of the laser beam to it being directed into reactor 12, except for when beam splitters are used to split the beam. The continuous fiber optic cable delivery system eliminates the energy loss associated with each mirror reflection, is easier to set up and requires less attention to details than mirrors, which need to have smooth surfaces and precise alignments. With the elimination of the mirrors assembly, the RHTR can be packaged in a portable suitcase and used as a mobile RHTR laboratory.

The two reflected laser beams each pass through a port window on opposing sides of the chamber and impact on opposing sides of the reactor so to uniformly heat the reactor. The chamber's port windows are made of a high quality glass known in the art that appears practically transparent to the laser beams, i.e. approaches 100% transparency for delivering the laser power to the metal side area (high conductivity) of the reactor. A typical power level for each laser beam is 50 W (watts), or 100 watts total, for heating the reactor.

Other components of the RHTR device of FIG. 1 are a power supply 35 for supplying power to laser 12 and to data acquisition 13; a reactor positioning device 37 for moving the reactor and the substrate to an exact desired position inside chamber 11; gases 39 connected to a gas line that have valves 41a and 41b in-line, with one gas line connected as an input to chamber 11, another gas line connected to oil trap 43, and a gas line that branches off just before oil trap 43 and is routed as a gas input to six-way valve 45 with a valve 41c in that line; oil trap 43 is connected through a valve 41d to a vacuum pump 47. Six-way valve 45 is connected to sampling coil 49 and to GC/MS 14 and through an in-line valve 41e to sampling probe 15 used to place a sample onto the substrate inside the reactor. The gas line is metered by meter 51 and the vacuum line is metered by meter 53. The circular openings depicted on three visible sides of chamber 11 in FIG. 1 are port holes made of glass that is transparent to passage of the laser beams into the reactor and to viewing the inside area of chamber 11.

Figure 3:
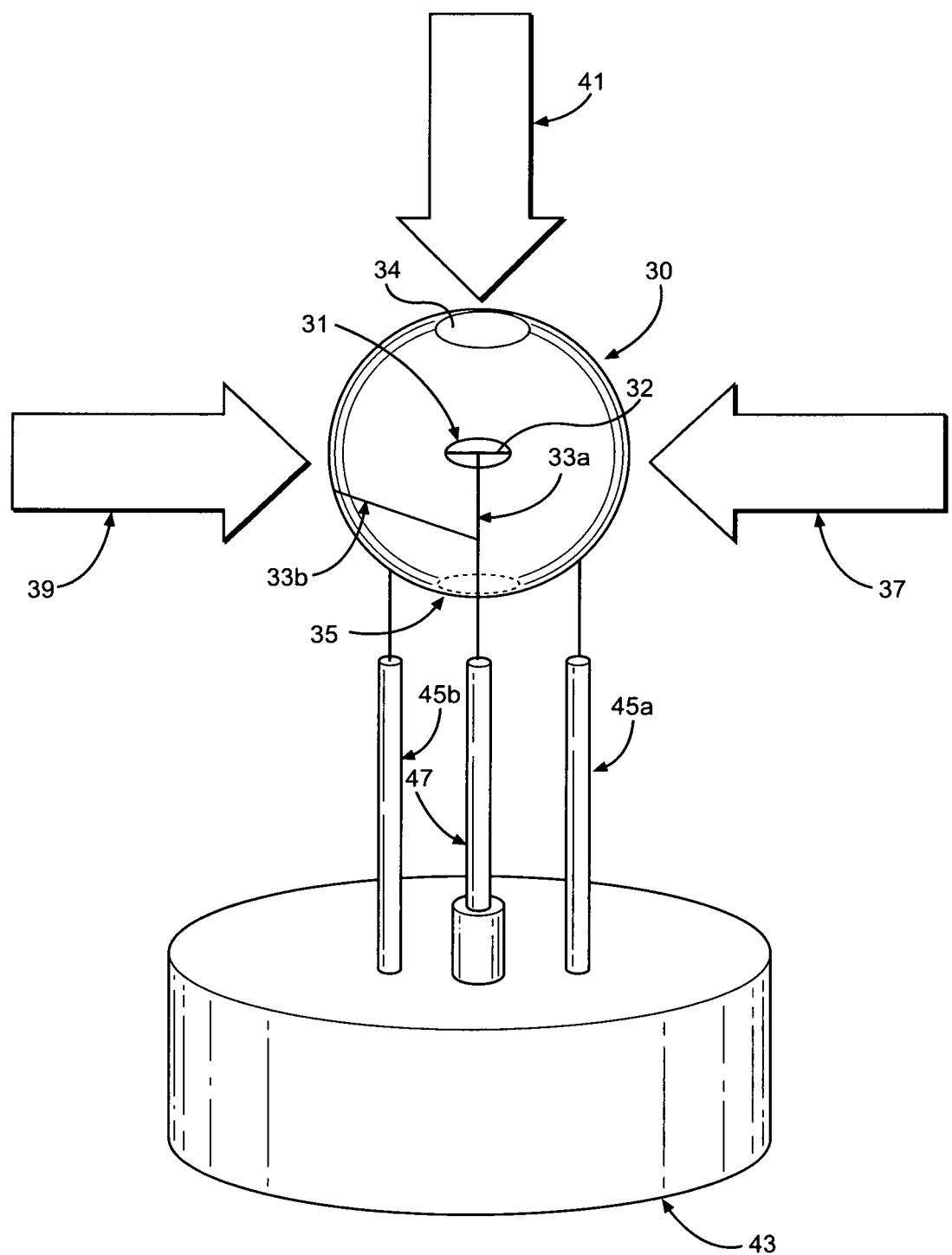
FIG. 3 is a schematic diagram of the RHTR reactor sphere.

Reactor positioning device 37 for moving the reactor and the substrate to an exact desired position inside chamber 11 is shown as being connected to a substrate to support a single sample, for the embodiments of FIG. 1 and FIG. 3. However, in another embodiment, the substrate is rotatable and is used to support multiple samples at the same time. Reactor positioning device 37 can be used for exact positioning of a substrate according to either embodiment.

RHTR System's Thermal Reactor

FIG. 3 is a schematic diagram of the RHTR system's sphere-shaped reactor 30. In one embodiment, reactor 30 consists of a small copper-foil sphere with a diameter of 18.2 mm+0.1 mm and a wall thickness of 0.14 mm. There is an opening 34 with a 7.2 mm diameter in the top, and an opening 35 with a 4.0 mm diameter at the bottom. It is to be noted that the ±0.1 mm estimation of the measurement uncertainty for studies done with this reactor is determined from a statistical analysis of a series of replicated measurements, that are referred to as a Type A evaluation of uncertainty, and from means other than statistical analysis, that is referred to as a Type B evaluation of uncertainty.

Top opening 34 of the sphere is used through-which to place the sample and direct a third heating laser beam. Bottom opening 35 of the sphere is for the routing of thermocouples 33a and 33b there-through. Thermocouples 33a-b have already been described above with a brief reference to FIG. 3 made in discussing FIG. 1. Thermocouple 33a attaches to substrate 31 and is a K-type fine-wire thermocouple, 0.025 mm in diameter and is unsheathed. Thermocouples 33a-b come together and enter into an insulated outer sheathing 47 that connects into a base 43. The reactor's inner wall is in one embodiment in contact with a second thermocouple 33b. Both thermocouples were fabricated using spot-welding technology. The thermocouple time response was estimated to be 0.05 seconds (s) to reach 63.2% of an instantaneous temperature change. The time-resolved temperature measured by each thermocouple (with data collection set at a sampling rate set of 10 samples per s) is the thermal response signature of the substance and reactor, respectively. In other words, the thermal response signature of the sample is the change in sample temperature with time as measured by the thermocouple 33a.

A sample of the material under test is placed inside, at the center, of reactor 30 on a disk-shaped substrate 31 that rests on thin-wire extensions 32 from one thermocouple 33a. In other words, thermocouple 33a both supports substrate 31 and senses the temperature of substrate 31 and outputs that temperature data for processing. The material from which the substrate is made can vary e.g., copper, gold plated, aluminum, or nickel, so long as the material chosen to excludes any chemical interaction with the sample. In one embodiment, substrate 31 has a diameter of approximately 5 mm and a thickness of 0.14 mm. The diameter can vary depending on the size of the reactor, with the range from 2 mm to about 8 mm with allowances outside of that range. Similarly, the thickness of the substrate can vary from about 0.05 to about 0.25 mm with variances outside of that range.

The sample is heated by first and second laser beams 37, 39 impinging upon the sample from opposing sides of reactor 30. Actually both the sample and the substrate are heated because the sample rests on the substrate and the temperature sensed by thermocouple 33a is the temperature of substrate 31. The sample's temperature is the same as the substrate's temperature. A third laser beam 41 is focused onto the sample through top opening 34.

Other components in FIG. 3 are supports 45a and 45b that provide physical support for the reactor and base 43 that serves as the foundation for the reactor assembly and supports 45a-b.

Infrastructure Implementation Details

The RHTR can operate in one of two modes to measure heat loss of a sample: a Direct Heating mode and a Heating Rate mode. The Direct Heating mode of thermal analysis, also referred to as the "direct-heating approach," involves direct laser heating of the sample from a third diverted beam through opening 34 in the top of reactor 30 (see FIG. 3). The third diverted beam power can be less than 3% of the total incident power. The Heating Rate mode of thermal analysis, also referred to as the "heating rate approach," involves heating the reactor at two different laser fluencies (from two opposing sides, not using the top third laser beam). Chemical kinetic parameters (i.e., endothermic and exothermic rate constants) of the chemical processes are deduced from this approach from time-resolved temperature measurements of the sample and reactor.

Both approaches decouple experimentally the effects of a chemical heat release, and gas conductive (or convective) and radiative heat losses. The two approaches are equivalent and complement each other and improve the RHTR method's accuracy. Also some of the sample types, such as liquid fuels, can benefit from the 'heating-rate approach' versus the 'direct-heating approach'. The second (heating rate approach) is also advantageous when determining thermophysical properties of solids such as absorptivity.

Substances that can be analyzed include solids, liquids, and various multiphase and multicomponent inhomogeneous substances. The sample is heated via radiative transport from the inside surface of the reactor sphere. Digital control of the laser intensity by means of the laser arc lamp current allows for programming of the desired steady state temperature and heating rate with a computer-controlled data acquisition and control system. This allows for rapid heating of the sample and investigation of processes such as high temperature decomposition and reaction chemistry. The high thermal conductivity of the copper sphere reactor, and the radiation heat transfer between the interior sphere surface and the sample within the sphere, results in a uniform sample temperature.

For example, the thermal conductivity and specific heat of copper are 4.01 $W \cdot cm^{-1} \cdot K^{-1}$ and 0.384 $J \cdot g^{-1} \cdot K^{-1}$, respectively. The uniformity in temperature of heating a millimeter-sized sample placed within the center of the sphere (over an area of approximately 78.5 $mm^2$) is of the order of 1 K. (degrees Kelvin). This uniformity in sample temperature depends on the relative dimensions of the sample and reactor sphere, laser beam width, and reactor thermal conductivity. Also, since the temperature varies over the reactor surface, the distribution must be the same for different laser fluences to provide a uniform temperature distribution over the sample.

The uniform temperature distribution is achieved by using lens to focus the laser beams onto the same cross-sectional area of the reactor surface for different laser fluences. Heating rates on the order of several hundred degrees K/s can be achieved depending on the maximum achievable laser power and the sensitivity of the temperature sensor. The apparatus can analyze sample quantities from a few milligrams up to a few grams. The surrounding environment can handle a variety of gas compositions (e.g., oxidizing, humid, inert, mixtures), and gas gauge pressures (ranging between 10 Pa and 505 kPa).

The main mechanism of heat transfer in the reactor, at higher temperatures, is thermal radiation (see Table 1). Heat transfer due to gas conduction makes up a small portion of the total. Convective heat transfer is avoided by two means: using a low gas pressure ($10^4$ Pa instead of $10^5$ Pa) and using a small reactor.

TABLE 1

Calculations of thermal radiation and gas conductive heat transfers for a spherical sample at different temperatures.

| Temperature, K | Thermal radiation: $R(T)_R = 4\pi r^2 \alpha \sigma(T^4 - T_o^4)$, % | Gas Conduction: $R(T)_g = 4\pi r^2 x(T)(T - T_o)/d$, % |
|---|---|---|
| 500 | 60 | 40 |
| 1000 | 89 | 11 |
| 1500 | 96 | 4 |

Theoretical Considerations of the Method

The theoretical model used to determine the heating value and reaction kinetics, as well as other thermophysical properties, is based on a representation of the heating process associated with the experimental arrangement described above for a given temperature and wavelength. The following thermal energy balance governs the heating process:

$$C_p m dT/dt = P(T_r) - F(T,T_o) + m_s q(T) \quad (A)$$

where the rate of change of internal energy is given by the term $C_p$ m dT/dt on the left side of Eq. A; $P(T_r)$ is the rate at which heat is transferred from the reactor at temperature $T_r$ to the sample and substrate; and F(T, To) is the rate of heat loss from the sample; T is the sample/substrate temperature; $C_p$ is the sample/substrate specific heat; m is the sample/substrate total initial mass; t is time and $m_s q(T)$ is the heat release due to a chemical reaction.

The change in mass during thermal heating and chemical reaction is considered and accounted for in the determination of the energy release by weighing the sample initially and after heating. The heat transfer term $F(T, T_o)$ depends on the sample shape and represents the sample heat losses due to conduction through the gaseous medium, conduction through the temperature sensor wires, and radiation (the main mode of heat transfer). Convection is assumed to be negligible inside the reactor due to its small size and the low gas pressure (Table 1). The parameter $T_o$ is the sample temperature at steady state (see FIGS. 4 a and b, to be discussed infra). Heat release due to a chemical reaction is given by the last term of Eq. A, $m_s q(T)$, and is included if the substance is chemically reactive. The parameter $m_s$ is the mass of the reactive portion of the sample (determined by weighing the sample before and after the experiment, and assuming that only the nonreactive portion of the sample remains upon completion of the experiment), and q(T) is the specific heat release rate due to chemical reaction.

The different regimes of the heating curve (see FIG. 4a, discussed infra) are represented below by (Eq.1) the temperature rise (laser heating and an increase in the sample temperature); (Eq.2) steady-state (for which there is no longer a change in temperature with time); and (Eq.3) decay (for which the incident laser beam intensity is zero and the sample temperature decreases). Specifically, the three regimes (assuming no chemical reactions) can be expressed by $$C_p(T)m\left(\frac{dT}{dt}\right) = I_\lambda A\beta(T,\lambda) - F(T, T_0) \quad (1)$$

$$I_\lambda A\beta(T,\lambda) = F(T, T_0) \quad (2)$$

$$C_p(T)m\left(\frac{dT}{dt}\right) = -F(T, T_0) \quad (3)$$

Where: $T_o$, T are initial and changing temperatures in K; $\beta(T,\lambda)$ is absorption coefficient which depends from temperature and spectrum (i.e., wavelength); $I_\lambda$ is laser intensity for a given wavelength; $C_p$ is heat capacity of the sample; m is mass of the sample; $F(T,T_o)$ is a total heat transfer term which includes gas conductive and radiative mechanisms.

Direct-Heating Approach (Also Known as a Third Beam Approach):

This heat loss parameter can be determined by heating by laser radiation separately at a constant reactor temperature, and then τ is measured directly as the relaxation/decay time of the sample's temperature. Temperature measurements and corresponding formulas are referenced in FIG. 4. A flowchart of the steps in using the direct-heating approach for determining a heat loss parameter is presented on FIG. 5. The character of the relaxation of the temperature of a sample to its previous level, after turning off this third beam, will help to determine the heat loss parameter for the RHTR system experimentally. In Eq. A, the parameter P(T) can be represented as $P(T)=\beta I$, where I is the laser beam power, and P is the portion of that power that is absorbed by the sample. Total heat transfer term expression is $F(T,T_o)=C_p m(T-T_o)/\tau$. The temperature relaxation can be presented as:

$$T-T_o = (T_{max}-T_o)\exp(-t/\tau) \quad (4)$$

where $T_{max}$ is the maximum (steady-state) temperature due to heating of the sample directly through the top opening in the reactor at time $t_o$. At time t, this additional heating is turned off and the temperature of the sample with a substrate is relaxed to its previous equilibrium (steady-state) level $T_o$. For an accurate determination of a heat loss parameter (i.e., inverse relaxation time), additional heating should meet the following requirement: $T_{max}-T_o \ll T_o$. Tau (τ) is the temperature-dependent relaxation time to equilibrium, which may be defined in any infinitesimal time interval as:

$$\tau(T)=t/\ln[(T_{max}-T_o)/(T-T_o)] \quad (5)$$

Figure 4:
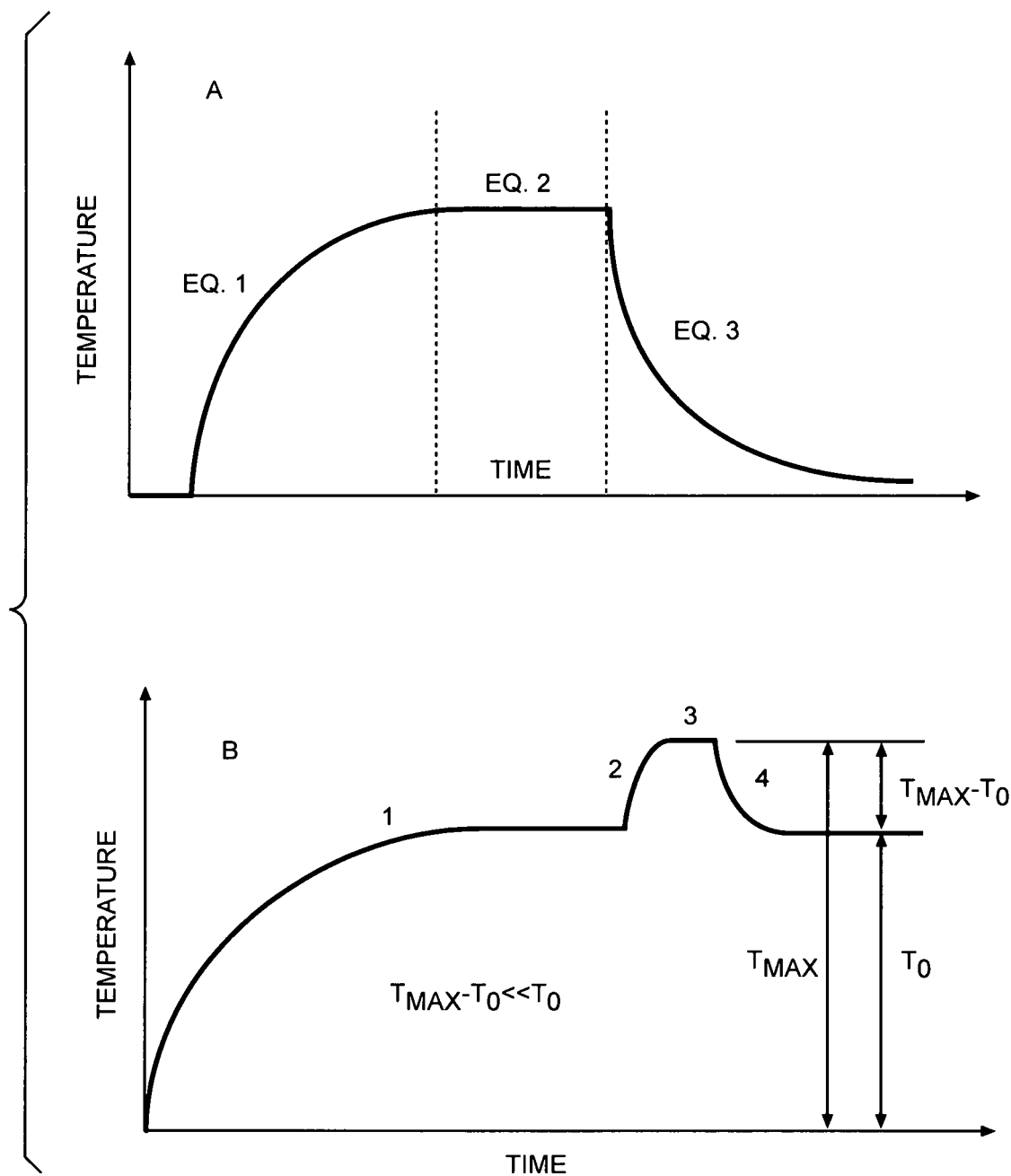
FIGS. 4 (a) and (b) are graphs of the thermal analysis process for the RHTR based on direct-heating method/approach.

Turning now to FIG. 4, FIGS. 4 (a) and (b) are graphs of the thermal analysis process for the RHTR based on direct-heating method/approach. Both FIGS. 4(a)-(b) present temperature versus time graphs, FIG. 4(a) for when no third beam is applied to the sample and FIG. 4(b) with a third beam applied to the sample.

The graph of FIG. 4(a) consists of three segments, each segment having the shape of its graph segment calculated pursuant to an equation, namely, equation 1, equation 2 and equation 3, supra. This shows that the sample temperature increases over time in accordance with equation 1 before reaching a steady state temperature in the region defined by equation 2. The heating source (laser beam) is then turned off and the sample temperature is allowed to relax in accordance with equation 3.

FIG. 4(b) shows that with a third laser beam directed to the sample, this causes it to reach a second steady state temperature. When heat is first applied, the sample's temperature increases with time as indicated by segment "1" on the graph. When the sample reaches a steady state temperature, indicated by the flatness of the temperature over time, a third laser beam is applied as a heat source directed onto the sample. This causes the sample's temperature to again increase, as indicated in the segment "2" on the graph. When the sample again reaches another steady state condition, indicated by "3" in FIG. 4(b), the third beam laser is cut off and the relaxation of the sample's temperature occurs during the segment "4" in FIG. 4(b).). Thus the numbers 1-4 in FIG. 4(b) indicate segments of the process described by the graph, including when the direct heating is turned on or off.

The temperature at which the sample reaches its first steady state is $T_o$; the temperature at which the sample reaches its second steady state is $T_{max}$. The additional rise in sample temperature to reach the second steady state is represented by $T_{max}-T_o$, and $T_{max}-T_o \ll T_o$. In other words, the slight rise in sample temperature due to the third beam heating to reach the second steady state condition is much less that the sample's rise in temperature to reach the first steady state condition.

Figure 5:
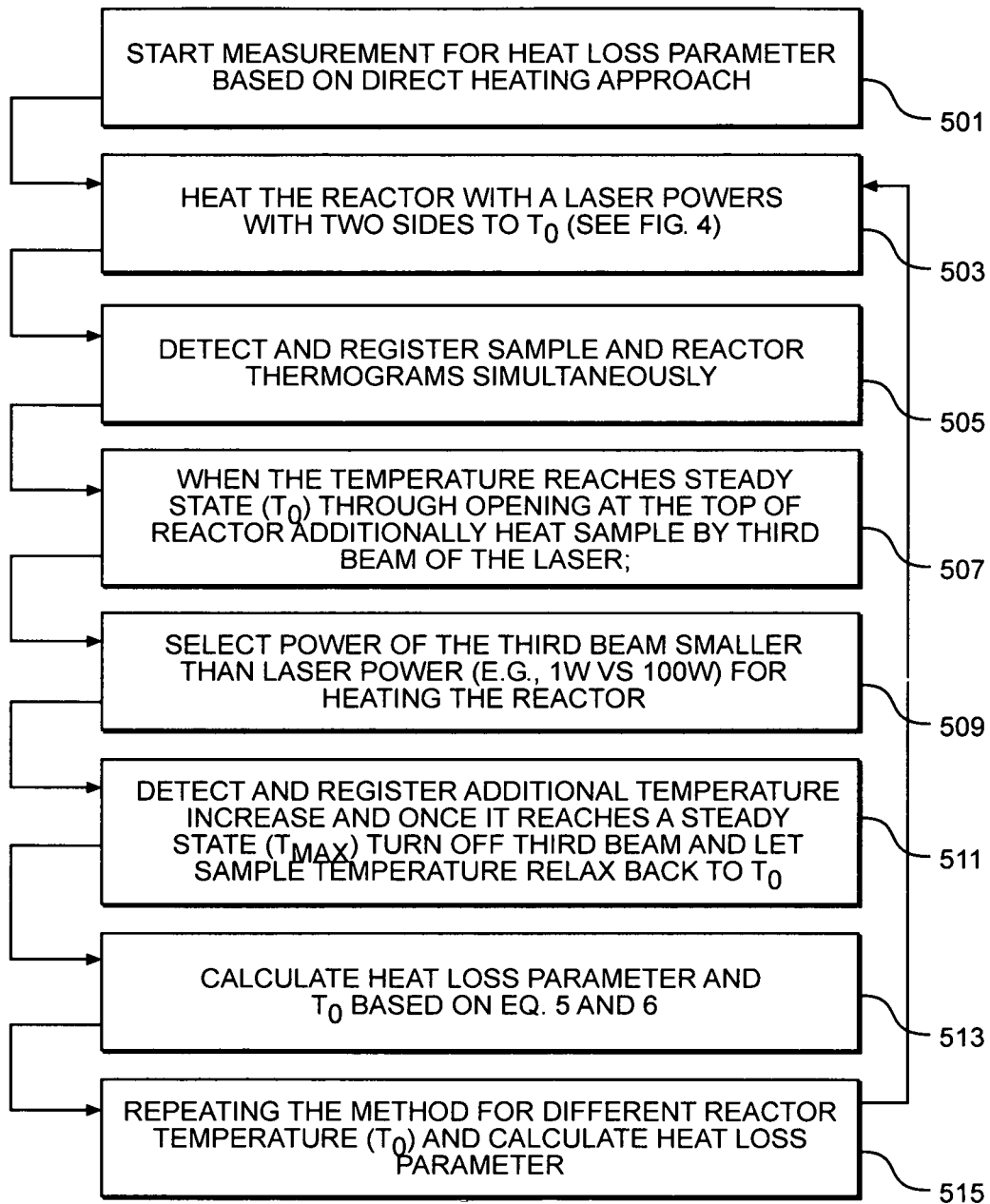
FIG. 5 is a flowchart of the direct-heating approach used for determining the heat loss parameter based on the structure of FIG. 3 and the generated graph types of FIG. 4.

FIG. 5 is a flowchart of the direct-heating approach used for determining the heat loss parameter based on the structure of FIG. 3 and the generated graph types of FIG. 4, The method for conducting a thermal analysis using the direct-heating approach begins with step 501 in FIG. 5 to start the measurement for heat loss parameter based on the direct-heating approach.

In step 503, the reactor is heated with a laser power from two sides of the reactor to a temperature $T_o$. Even though the two opposing side heating is one alternative embodiment, this step is not so limited. The reactor can be heated in any manner until it reaches a steady state temperature of $T_o$. Next, the user simultaneously detects and registers the sample and reactor plots of temperature vs. time, i.e. the two thermograms, as in step 505. In one embodiment, this is done simultaneously, meaning that the thermograms are plotted as the graph data is generated.

In the next step 507, when the temperature reaches steady state temperature $T_o$, the sample is additionally heated by a third beam of the laser through an opening at the top of the reactor. This step is not so limited to what opening or what laser is used. The third beam could be generated by splitting an output beam from a laser using a splitter; or a separate laser could be used to generate the third beam. These are just two examples. Also the sample can be heated anew by any means, through any opening or apparatus associated with the reactor. It is a preferred arrangement however, that the third beam is either split off from an original laser beam or outputted from a separate laser and is focused downwardly onto the sample.

In step 509, the user selects the power of the third beam to be smaller than the laser power used to heat the reactor and sample to the first steady state temperature $T_o$. To illustrate, a typical laser power for heating the reactor may be 100 W (watts) with the laser power directed to the sample to reach the second steady state temperature may be 1 W—see $T_{max}$ in FIG. 4(b).

In step 511, the system detects and registers the additional temperature increase of the sample until it reaches a second steady state condition, i.e. where the temperature levels off and stops increasing with the passage of time. This additional temperature increase is indicated as $T_{max}-T_o$ in FIG. 4(b) and brings the sample to a temperature of $T_{max}$. The third beam is then turned-off and the sample's temperature is allowed to relax back to the first steady state temperature, $T_o$.

In the next step 513, the heat loss parameter and $T_o$ are calculated based on equations 5 and 6, which are:

$$\tau(T) = t/\ln[(T_{max} - T_o)/(T - T_o)], \qquad (5)$$

and $$\frac{dT}{dt} = (T - T_o(T_r))/\tau(T) \qquad (6)$$

The method is then repeated for a different reactor temperature $T_o$ and the heat loss parameter is again calculated, by going back to step 503 and repeating it and its following steps again.

Heating-Rate Approach:

This method provides additional measurement for the heat loss parameter independent of probing lasers and improves the accuracy through a combination with the first direct method and also allows using samples which are only liquids, e.g., fuels. Assume the reactor temperature $T_r$, is constant, the sample temperature is T, and it is differing from its ultimate equilibrium value, $T_o$. The process of sample temperature evolution is given by the equation:

$$\frac{dT}{dt} = (T - T_o(T_r))/\tau(T) \qquad (6)$$

Tau ($\tau$) may be defined in any infinitesimal time interval as:

$$\tau(T) = C_p m dT/dF(T,T_o) \qquad (7)$$

Figure 6:
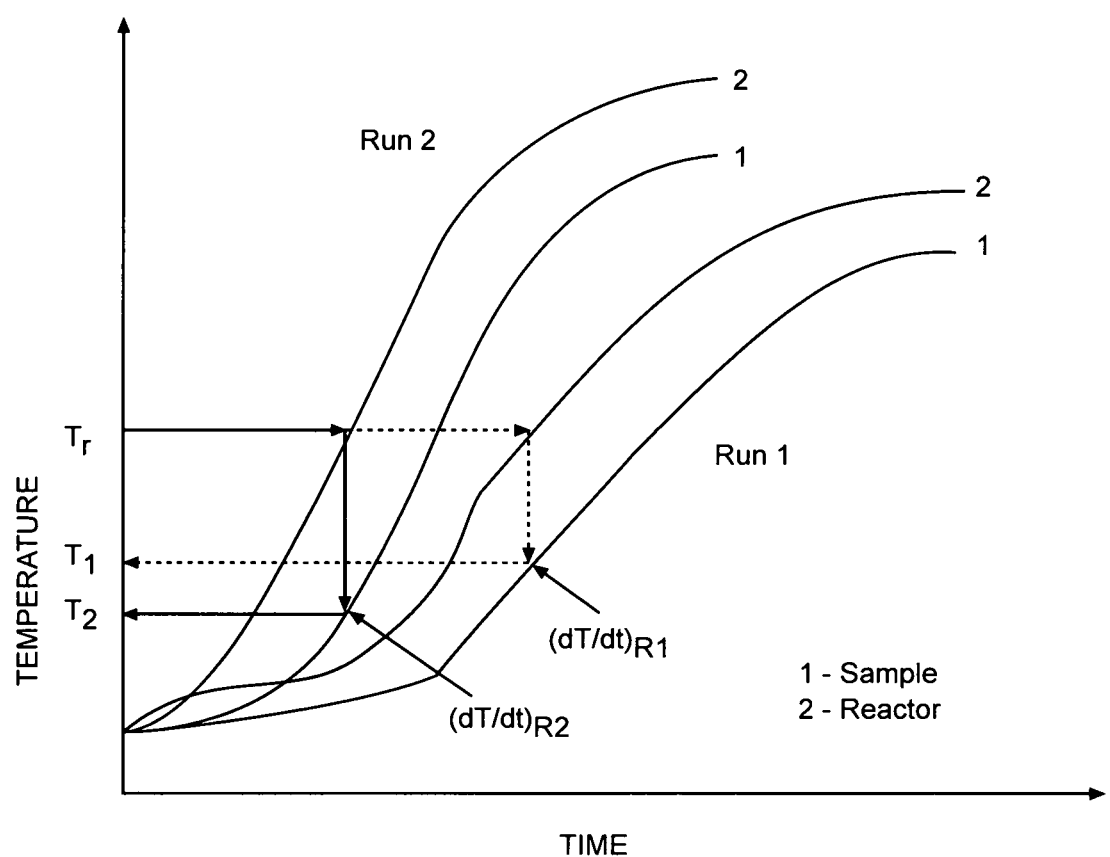
FIG. 6 presents a graph of results from the thermal analysis process for the RHTR based on the heating-rate method.

On the basis of two measurements/runs of the temperatures of the reactor and the substrate with a sample, and with reference to FIG. 6 that presents graphs determined from the thermal analysis process for the RHTR based on the heating-rate method, one can determine the equilibrium (steady state) temperature $T_o$ and the relaxation time of a system. They are given by the following formulas:

$$\tau(T) = (T_2 - T_1) \bigg/ \left[\left(\frac{dT_1}{dt}\right) - \left(\frac{dT_2}{dt}\right)\right] \qquad (8)$$

$$T_o = \left[T_1\left(\frac{dT_2}{dt}\right) - T_2\left(\frac{dT_1}{dt}\right)\right] \bigg/ \left[\left(\frac{dT_2}{dt}\right) - \left(\frac{dT_1}{dt}\right)\right] \qquad (9)$$

where $T_1$ and $T_2$ are sample temperatures for two different heating rates (1 and 2) resulting in these temperatures, and $(dT_1)/dt$, $(dT_2)/dt$, are their derivatives. The method is represented by equations (8) and (9) and is referred to as the "heating-rate approach".

FIG. 6 illustrates two heating rate method "runs," each made with a different laser power. In each, the temperature of the sample lags behind that of the reactor. For Run 1, the difference in temperature between the sample and the reactor at a given time, $(dT/dt)_{R1}$, is $T_r-T_1$. For Run 2, the difference in temperature between the sample and the reactor at a given time, $(dT/dt)_{R2}$, is $T_r-T_2$.

Figure 7:
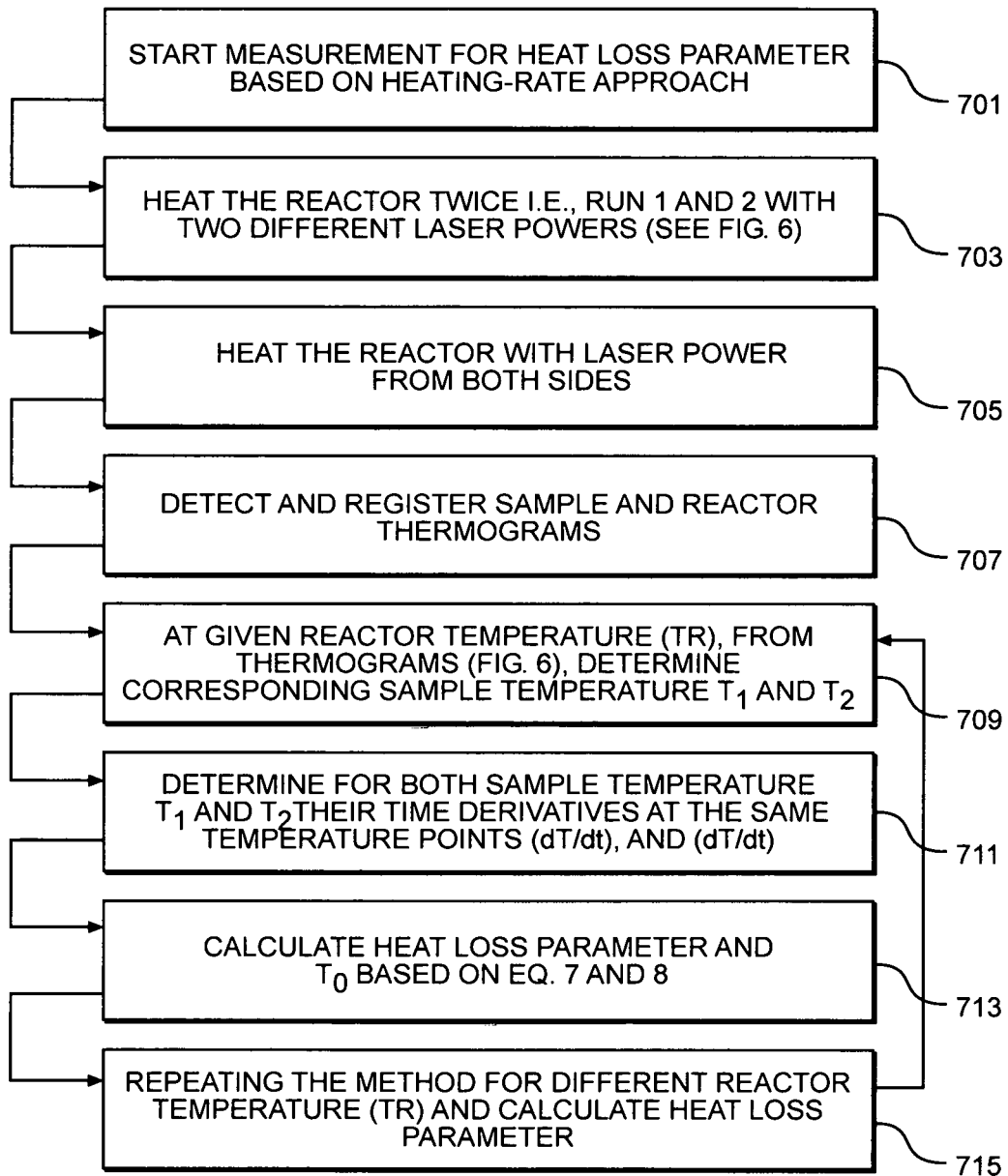
FIG. 7 is a flowchart showing the heating-rate method used for generating data used in creating the graphs in FIG. 6.

FIG. 7 is a flowchart showing the heating-rate method used for generating data used in creating the graphs in FIG. 6 from which the heat loss parameter can be determined. This method is based on determining the delay in the rise of the sample temperature while heating the reactor (i.e., the "heating rate" when the sample temperature follows the temperature of the reactor). The method for conducting a thermal analysis using the heating-rate approach begins with step 701 in FIG. 7 to start the measurement for heat loss parameter based on the heating-rate approach.

The user first heats the reactor twice, that is, runs a Run1 and a Run2 with two different laser powers. This will produce graphs similar to those shown in FIG. 6. The reactor is heated with a laser power from both or opposing sides (Step 705). Next thermograms of the sample and the reactor are detected and registered (Step 707). Then at a given reactor temperature ($T_r$), from the thermograms (FIG. 6), determine corresponding sample temperatures $T_1$ and $T_2$ (Step 709). Next, determine for both sample temperatures $T_1$ and $T_2$ their time derivatives at the same temperature points, $(dT/dt)_1$ and $(dT/dt)_2$ (Step 711). In Step 713, the heat loss parameter and $T_o$ are calculated based on equations 7 and 8, which are:

$$\tau(T) = C_p m dT / dF(T, T_o) \qquad (7)$$

and $$\tau(T) = (T_2 - T_1) \Big/ \left[\left(\frac{dT_1}{dt}\right) - \left(\frac{dT_2}{dt}\right)\right] \qquad (8)$$

The method is then repeated for a different reactor temperature $T_r$ and the heat loss parameter is again calculated, by going back to step 709 and repeating it and its following steps again.

Figure 8A:
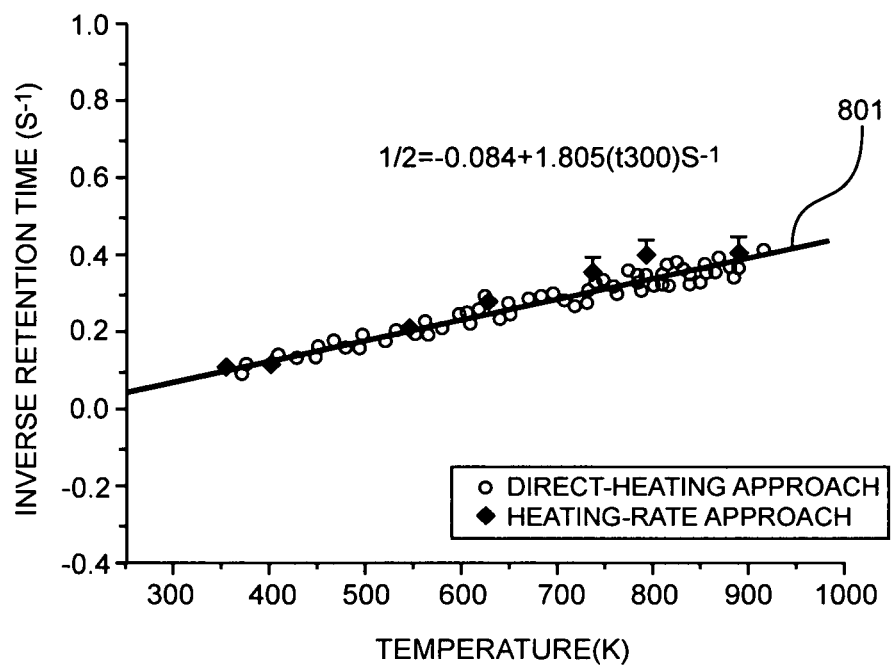
FIG. 8(a) is a graph showing a heat transfer (loss) parameter for a substrate over a temperature range for both Direct Heating and Heating Rate measurement methods.
Figure 8B:
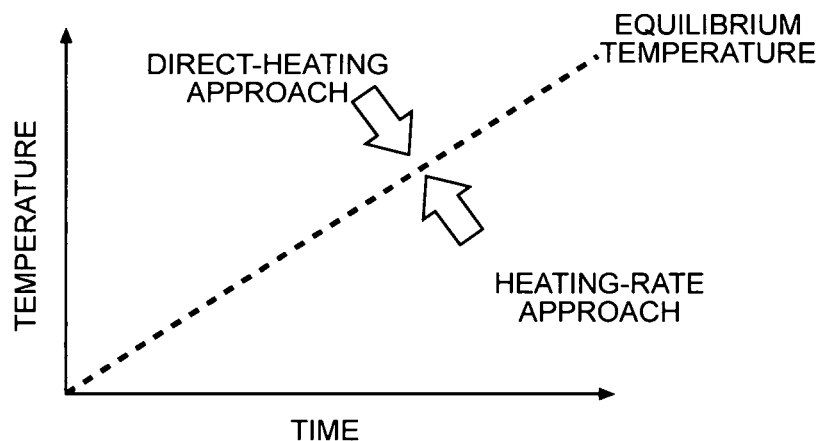
FIG. 8(b) is a graph showing use of the combined direct heating and heating rate methods.

FIG. 8(a) is a graph showing a heat transfer (loss) parameter (i.e., inverse relaxation (decay) time) for a substrate over a temperature range for both Direct Heating and Heating Rate heating methods. Thus FIG. 8 shows the heat transfer (heat loss) parameter determined for both heating methods over a wide temperature range. FIG. 8(a) shows for the measured data an inverse relaxation time varying from approximately 0.0 to 0.5 s$^{-1}$ over a temperature range of from approximately 300 to 950 degrees Kelvin (° K). The data points are represented by open circles for the direct-heating approach and by closed or filled-in circles (i.e. the black dots) for the heating-rate approach.

The methods are independent and can improve a confidence level of the measurement. For example, if the level of uncertainty, $u_1$ for the first approach is about 15% and for the second approach $u_2$ is also about 15% then the total uncertainty can be determined as $=u_1 \times u_2 = 0.15 \times 0.15 = 0.02$ thus improving the combined confidence level of the measurement to 98%. As is seen from FIG. 8(a), the extrapolated line 801 for the data points compiled for both approaches shows that the two approaches track one another reasonably well.

Combined Direct-Heating and Heating-Rate Methods

A new method of measuring and determining a heat transfer parameter has been devised by combining two independent methods or approaches and this is found to achieve a higher accuracy of measurement than either approach alone.

The first approach is direct-heating, based on increasing the equilibrium temperature and determining the heat transfer parameter based on, the temperature relaxation back to equilibrium level (steady state, see FIGS. 4(b) and 5). The second approach is heating-rate, based on the phenomenon that there is a time-lag between the reactor temperature and the corresponding substrate temperature (see FIGS. 6 and 7). For a given laser power, unlike the reactor, the substrate always achieves its equilibrium temperature with some delay due to heat transfer inside of the reactor.

The two approaches determine the same heat transfer parameter from a higher (due to direct heating) temperature region than the equilibrium temperature region, and from a lower (due to time-lagging) temperature region. See FIG. 8(b) for an illustration. Thus the methods complement each other and improving the accuracy of reaching the actual heat transfer parameter. The combined method in one embodiment uses the heating-rate approach first and reaching its steady state temperature and then using the third laser beam to perform the measurement with the direct-heating approach. Carrying out this inventive method of combining both the direct-heating and the heating-rate approaches can also be done in the reverse order, i.e. by carrying out the direct-heating measurement first then carrying out the heating-rate measurements.

Improved and Novel Laser System Methods in a RHTR System

It is understood that a laser parameter can be expressed in terms of a laser's wavelength or frequency. Since a laser emits light through a process of optical amplification based on the stimulated emission of electromagnetic radiation, the equation that relates wavelength and frequency for electromagnetic waves as in a laser is: $v=c$ where X is the wavelength, v is the frequency and c is the speed of light. In discussions that follow, this laser parameter is mainly expressed in terms of wavelength.

Multi-Probe Third Beam

Continued research has discovered advantages in using a number of different laser wavelengths as probing beams. Absorption and heat release of materials occur at different frequencies, similar to resonant frequencies of the material. Therefore using a laser at one frequency may miss the complete picture of thermal analysis for any given material, be it a solid or fluid. Combining multiple lasers or using multiple lasers both independently and together to measure absorption coefficient at a specific wavelength gives a more complete analysis. The integrated values of multiple wavelengths, based on combined wavelengths, represents closer to real-word conditions and hence gives a better picture of a material's thermal behavior.

Lasers are characterized according to their wavelength in a vacuum. A "single wavelength" laser produces radiation with a laser beam at a certain frequency. The laser beam can have more than one polarization and can be a continuous beam or a pulsed beam. The pulsed beam can have a variable pulse width and variable duty cycle that are predetermined in any RHTR use. A laser can comprise one or multiple wavelengths output, or alternatively, multiple lasers can be used to produce RHTR heating beams of multiple wavelengths. One can modulate the laser beam at a frequency to achieve a desired result, such as for an adjustment of the laser's average power or for filtering and obtaining a noise reduction in the processing procedures performed on the compiled data.

A laser's electromagnetic radiation (EMR) refers to the waves (or their quanta, photons) of the electromagnetic field that a laser beam causes to propagate carrying energy in the form of light photons having certain characteristics, such as being a laser beam of a certain wavelength. In the infrared range, one effect of EMR on materials is the heating caused from the combined energy transfer of many photons.

Consequently in one embodiment, a RHTR uses one or more lasers to produce one or more laser beam of multiple wavelengths and possible having at least one of: different polarizations; one, or a mixture, of a continuous and pulsed laser in the one or more laser beams; the different laser wavelengths being emitted simultaneously, or consecutive, or in a whatever predetermined sequence in heating the reactor and sample and/or in directly heating the sample.

Figure 9:
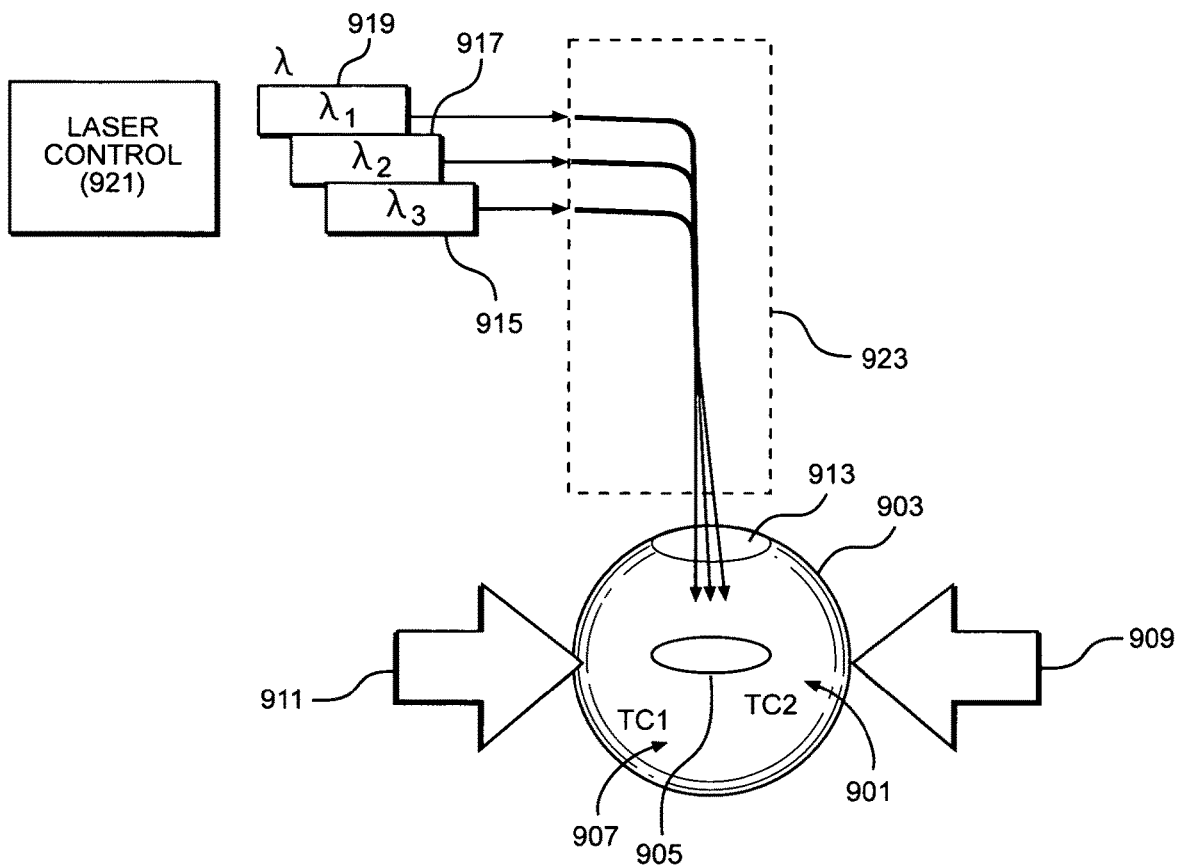
FIG. 9 is a schematic drawing of a multi laser probing and delivery system.

Referring to FIG. 9 which presents a schematic of a multi laser probing and delivery system, the RHTR multi-probe measurement system combines multiple laser wavelength probes and a fiber optic beam delivery system. The laser power for each beam is variable, with 0.5 W being one typical power setting for each beam. Laser system components used are available, for example, from Thorlabs Inc. in Newton, N.J., USA.

The system uses a 3-to-1 beam fiber optic beam coupling system to have multiple laser inputs with one output for the third beam application for heating the sample from the top opening of the reactor. This measures the sample's absorptivity for different laser wavelengths and powers. This method has enabled RHTR to fine-tune power vs wavelength distribution/ratio to eliminate negative effects of absorption 'enhancement' and/or 'shadowing' phenomena, thus creating a method which predicts a more accurate light absorption of aerosols in particular, as well as their impact on climate change. Use of the multi-probe system, although explained with reference to environmental aerosols, is not so limited, and can be used with any type of thermal analysis of a material or substance (the two words used interchangeably herein).

With reference now to FIG. 9, a substance 901 is placed on a substrate support inside a reactor 903. In FIG. 9, for convenience due to the closeness of the substrate and the substance, they are shown together as 901. The substrate supports the substance. The substance or sample being tested is, in this embodiment, aerosol particles on filters. The aerosol particles can be gathered any number of ways where a filter is exposed to the environment, one way being mounted on an aircraft where an exposed filter to incoming air captures aerosols in the atmosphere. Other capturing techniques are well known and the result of the filter containing the captured aerosols can then be subjected to a thermal analysis.

Two thermocouples are positioned inside the reactor for sensing and providing data output as to temperature inside the reactor. This is similar to the schematic diagram of the RHTR reactor shown in FIG. 3. Outputs of the thermocouples are connector to a data processor such as a computer or microprocessor for processing the data and for causing the data to be used in printing or creating thermograms for the substance under test. A first thermocouple 905 is positioned at or near the substrate, and a second thermocouple 907 is positioned at or near the inner surface of the reactor's wall. Although the temperature sensors are shown here as thermocouples, any type, and any number of temperature sensors can be used and they can be positioned at other one or more locations other than the two locations specified here. The reactor, and the substrate and sample, are heated by a first laser beam 909 and a second laser beam 911, each focused inwardly from opposing sides of the reactor.

A top opening 913 in the reactor receives a fiber optic cable for directing a third laser beam onto, and to heat, the substance being tested. In one embodiment, three lasers 915, 917, 919, each with a respective and different wavelength of $\lambda_1$, $\lambda_2$, $\lambda_3$, are used as the third beam. While three lasers are described in this embodiment, any number of lasers can be used with any respective wavelengths $\lambda$. These lasers are also referred to as three laser heads meaning the output port of the laser which is its "laser head." The laser itself contains an optical setup and laser resonator for forming the outputted laser beam at the laser head, A laser control 921 controls each laser, such as its power output, its wavelength, its timing and any other laser parameters.

A fiber-optical beam delivery system 923 receives each laser beam as inputs and delivers an output laser beam in a predefined format. The three beams can be combined so that a single combined laser beam comprising three different wavelengths is delivered onto the sample in the reactor. Alternatively, any one of the three beams can be delivered independently, and any of the three beams can be combined with another to deliver a single combined laser beam comprising two different wavelengths. In a preferred embodiment, fiber optic cable is used to route each laser beam from its respective laser head to the input at top opening 913 of reactor 903. However other types of routing systems can be used, such as a reflective mirror arrangement, for directing the laser beam to its target.

This approach of combining multiple laser heads, although described with respect to the third laser beam directed from the top of the reactor to the sample, can be applied as well to the opposing sides, two laser beams 909, 911. Beams 909, 911, can therefore be formed from a single laser head, or from a combination of two or more laser heads, as just described with respect to the third beam delivered into the reactor.

Direct Laser Delivery without Mirrors

Although the beam delivery system of using mirrors to reflect the laser beams at multiple points worked to improve thermal analysis techniques, it does have the drawbacks of being time-consuming to set up and delicate to orient due to the precision required in the mirror positioning, the imperfect mirror surfaces and it being subjected to movement from surroundings, vibrations and the like. In other words, in setting up the mirrored laser delivery system, it is akin to setting up a long row of dominos. One small misplacement or unintentional movement along the way and the chain that forms the delivery system can be adversely affected.

To overcome these drawbacks, a direct delivery has been developed that uses fiber optic cable throughout to have a laser delivery system without the use of mirrors, or any reflectivity of any kind. The ability to eliminate the reflective surfaces is significant because surface imperfections of mirrors and the reflection itself, causes a loss of energy in the laser of from 3% to 5% typically. For example, a mirror may be rated as 96% reflective, depending on the smoothness of its surface and possibly other factors. Multiple reflection surfaces in the delivery chain will multiply this 3-5% energy loss accordingly. Regarding laser loss from mirror reflection, see e.g., Marcuse, D. (1989), "Reflection loss of laser mode from tilted end mirror," in *Journal of Lightwave Technology*, vol. 7, no. 2, pp. 336-339, February 1989, herein incorporated by reference in its entirety.

Referring again to FIG. 9, this figure shows such a direct laser delivery system with respect to the third beam delivery, but this can be applied as well to the delivery of laser beams 909, 911 to opposing sides of the reactor by using flexible optic cable instead of mirrors. The optical cable can be bended and twisted to be delivered at a certain point into the reactor. This forms a continuous, non-interrupted and non-reflective, delivery of the laser beam to the reactor, thereby avoiding the substantial energy loss associated with using reflective surfaces and streamlining the entire delivery system setup. FIG. 1 would be changed by deleting the dashed lines illustrating three mirror reflection stages in delivering the laser beam to the reactor, and instead showing a direct fiber optic cable from laser 12 to beam splitter 23 and direct fiber optic cable from the beam splitter 23's two outputs to the opposing side inputs of chamber 11 and reactor 10. If two lasers are used, then the beam splitter is eliminated and you have a continuous delivery system of each laser beam via a fiber optic cable from each respective laser to each of the respective opposing sides of the reactor.

Scanning Laser

The effects of a laser's EMR across the infrared spectrum upon chemical compounds and biological specimens depend both upon the radiation's power and its frequency. The importance of the heating laser's wavelength in TR measurements has not in the prior art been given the attention it deserves. A material's frequency of absorbed photons is called its resonance frequency. Biological samples have resonant frequencies, and in the development of explosive detection especially, various detecting methods have been classified, one being a resonance frequency shift measurement. Determining a material's resonance frequency allows the user to detect a triggering event that might be missed if the measurement were made at a different wavelength well beyond the material's resonant frequency.

By scanning a predefined wavelength range, maximum and minimum absorption signals, for example, can be detected for materials covering a range of wavelengths. A scanning laser can measure specific patterns given off by hot gases over the infrared spectral band. A wavelength (frequency) response curve can thus be generated with a scanning laser.

This feature is an analytical tool for TR for probing the information of chemical composites by measuring characteristics of a sample, and particularly detecting both high temperature and specific frequency triggering events, by use of a scanning laser that applies a laser beam comprising a continuous scanning function over a predetermined range of frequencies, or spectral band. The laser thus scans the material for one or more of the material's resonance frequencies. This makes it possible to determine the frequency response of a material based on its composition.

The frequency response produces resonance indicators, that is, indicators of a triggering event at a certain frequency for that certain composite material. A database can then be compiled storing this information for a large host of material composites. Another beneficial feature is that the results obtained make it possible to optimize the resonant behavior of a particular compound, or to form a compound having a desired thermal response behavior, with a triggering frequency as a factor, be it to detect or to fabricate an explosive reaction, as just one example.

RHTR Multi-Sample Method

Figure 10A:
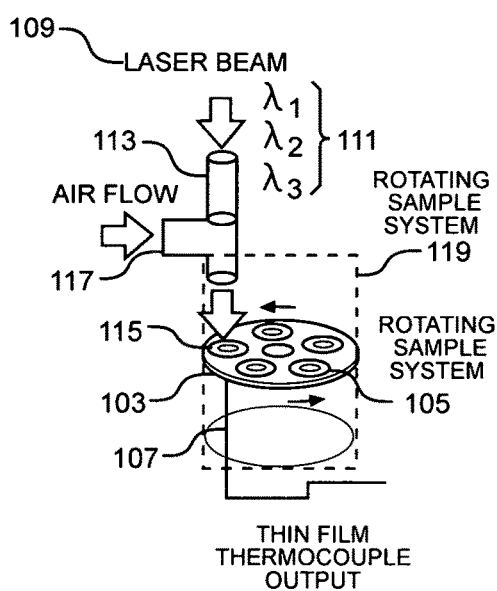
FIG. 10(a) is a schematic of a multi-sample measurement system with a rotating platform in an environmental enclosure as the reactor.
Figure 10B:
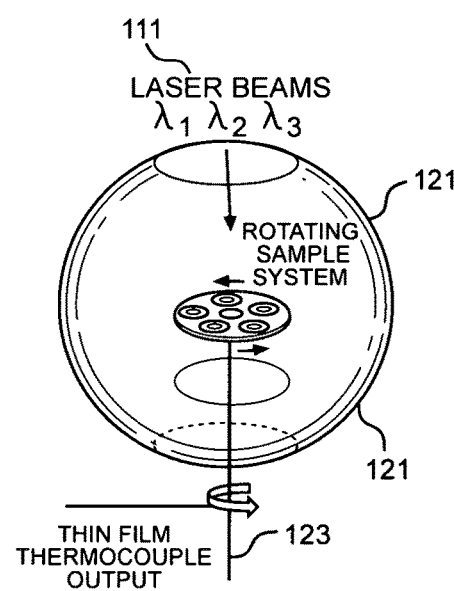
FIG. 10(b) is a schematic of the reactor with the multi-sample platform in a sphere-shaped reactor.

A multi-sample measurement system design with rotating platform and baseline sample is presented in FIG. 10. FIG. 10(a) is a schematic of a multi-sample measurement system with a rotating platform in an environmental enclosure as the reactor. FIG. 10(b) is a schematic of the reactor with the multi-sample platform in a sphere-shaped reactor.

The design allows for a mobile TR that can rapidly conduct TR on multiple samples without undue time spent in having to remove one sample from the reactor and replace it with a different sample. This is a driving need especially in mobile "field" applications. An accompanying need was for a miniaturized RHTR device that can be integrated on an airplane or an unmanned aerial vehicle (UAV) platform and will meet space, weight, and power requirements.

Exemplary Application: Environment Aerosols,

Industries, government agencies such as the National Aeronautics and Space Administration (NASA) and other entities interested in thermal analysis of environmental factors refer to what are called Climate Change Mathematical Models. In relating this to the environment, these models use absorption properties of aerosols to assess the aerosols' impact on climate.

FIG. 10(a) illustrates a testing design that uses a rotating sampling system that has at its center a circular disk-shaped, rotatable platform 103, on which are a plurality of recesses 105 for holding a sample material undergoing a thermal analysis, with five recesses shown as an example in the figure. A thin-film thermocouple is in contact with platform 103 for measuring temperature and output this temperature data to a computer or other signal analyzer for data processing. Thermocouple 107 is preferably attached to, or in physical contact with, or in a close physical relation to, platform 103 so to provide an, accurate reading of the temperature of the sample under test. Although one thermocouple is shows in FIG. 10(a), the design is not so limited, and any number of thermocouples can be used and positioned at any location within rotating sampling system 191 so to give the most accurate temperature reading of the sample on which measurements are being taken.

Platform 103 is rotatable so to position any one of the plurality of recesses, together supporting a plurality of samples, at a predetermined location. Platform can be held in place mechanically by a notch in the rotating structure or other convenient mechanism. Details for such a rotating platform or device that can be set at one of the multiple rotated positions are well known, and for this reasons those details for the rotation are not given here. Platform 103 can be rotated in either the clockwise or counter-clockwise direction as a matter of design choice, with the arrows indicating it has a counter-clockwise rotation in the drawing. Movement of platform 103 can be done manually or by mechanical or electronic control, using also well-known structures that also are not further described here.

A laser beam delivery system is in communication with rotating sampling system 101. In one embodiment, a laser beam 109 of three different wavelengths 111, $\lambda_1$ $\lambda_2$ and $\lambda_3$, is used as the heating source and is inputted through a channel 113 for focusing laser beam 109 onto a sample being tested held in recess 115. An air flow input 117 is connected into a side of channel 113 to enable an air flow into the path with the channeled laser beam 109. The air establishes the environment in which the sample measurements are taken. Instead of air, any other gas or fluid could be injected into the environmental enclosure in which the rotating sampling system is located.

The path now of air flow 117 and laser beam 109 is focused downward so the laser beam as merged with the air flow is directed to the top of the sample in recess 115 for heating the sample. The heating is controlled by a control system (not shown) connected to a laser system from which laser beam 109 is emitted.

In this embodiment, the rotating sampling system contains samples of filters with an aerosol collection on each filter from collection during a flight of a manned or unmanned vehicle on which the filter was exposed to capture aerosols in the atmosphere. The aerosols undergo a thermal analysis in a rapid manner by use of the rotating platform. This makes it unnecessary to go inside the reactor after each test to replace and set up again the TR system. Instead, after measurements are conducted on a first aerosol sample, platform 103 is rotated and a new TR analysis is commenced on a second aerosol sample. This continues until all the samples in rotating platform 103 have been tested, depending on the number of recesses on platform 103.

The entire system can be appropriately enclosed by an environmental enclosure 119. Environment enclosure 109 makes this compact unit into a reactor. The enclosure would have appropriate openings for the laser beam/air or gas intake and for the thermocouple 107's output. The small, compact size with the rotating multi-sample measurement system make this unit ideal for on-site TA measurements, such as while in an airplane at the same time that one or more filters are collecting atmospheric aerosols.

FIG. 10(b) illustrates a modified embodiment of the multi-sample system where multiple samples are placed inside a reactor with the inventive multi-sample platform. Laser beams 111 with wavelengths $\lambda_1$ $\lambda_2$, $\lambda_3$, are inputted through a top opening 119 in reactor 121. This is as discussed with reference to FIG. 3 and its details are not repeated here. A rod is connected to platform 103 for rotating the multi-sample platform, shown in the figures as being rotatable in the counter-clockwise direction. The thin film thermocouple provides its output to a data processing component (not shown). It is understood that laser beam 109 can consist of one laser beam of three combined wavelengths or it can consist of three independent lasers. Also, while three wavelengths are used in this example, the RHTR multi-sample design is not so limited and any number of wavelengths or a scanning laser, and a variation of the laser parameters available as earlier discussed, can all be incorporated herein as a user desires.

In the embodiments of FIG. 10, the multi-sample design will help particularly in near-real time atmospheric aerosol absorption measurements and its geospatial distribution for more accurate climate change predictive models.

Rotating Reactor with Selected Material for Uniform Heating

It has been shown that by using inventive features of the RHTA methods, rapid and accurate analysis of thermal behavior of materials can be obtained by subjecting samples to rapid, high temperature measurements. However, a limitation encountered during the research and experimentation in developing the RHTR systems was the material of the reactor. The basic requirement for a material for building the reactor with is a high thermal conductivity, to achieve uniform heating, and a high melting point given that at least two laser beams are impinging directly onto the material. Yet, there is a tradeoff between high thermal conductivity and low melting points.

Copper, for example, is a good conductor of heat but it has a melting point of only about 1,000 deg. On the other hand, aluminum oxide, $Al_2O_3$, in the class of ceramics, while not being as good a conductor and not a uniform distributor of heat, does has a melting point of 3,762° F. (2,072° C.). It is desirable to make use of the high melting point of $Al_2O_3$ and in pursuing efforts to seek a solution; the inventor discovered that heat can be distributed throughout the $Al_2O_3$ by adding a rotation of the reactor during the heating process. This is consistent with a theoretical approach to this situation.

Working with different reactive samples and corrosive environments requires more resistant reactor materials which can be heated uniformly. Below is the technical approach and methodology to achieve the objective. A simplified heat diffusion equation (see F. P. Incropera, D. P. DeWitt, Fundamentals of Heat Transfer, 1981) is:

$$\frac{\partial T}{\partial t} = K\nabla^2 T = K\left(\frac{\partial^2 T}{\partial x^2} + \frac{\partial^2 T}{\partial y^2} + \frac{\partial^2 T}{\partial z^2}\right) \quad (10)$$

Material thermal diffusivity K (not to be confused with "K" Kelvin degrees) is defined as $K=k/(\rho\, C_p)$, where k is material thermal conductivity (W/(m·K)), $\rho$ is density (kg/m$^3$), and $C_p$ is specific heat capacity (J/(kg·K)). Term ($\rho\, C_p$) is considered the volumetric heat capacity (J/(m$^3$·K)). Thermal diffusivity is the thermophysical property that defines the speed of heat propagation by conduction during changes of temperature.

Thermal diffusivity is the ratio of the time derivative of temperature and temperature gradient and it quantifies the rate at which temperature distribution becomes uniform ("smoothed out"). Thermal diffusivity is also the measure of thermal inertia. In a substance with high thermal diffusivity, heat moves rapidly through it because the substance conducts heat quickly relative to its volumetric heat capacity. Thus the thermal diffusivity is a more accurate measure for characterizing non-isothermal regimes because it is related to the thermal conductivity, specific heat capacity and density.

Figure 11:
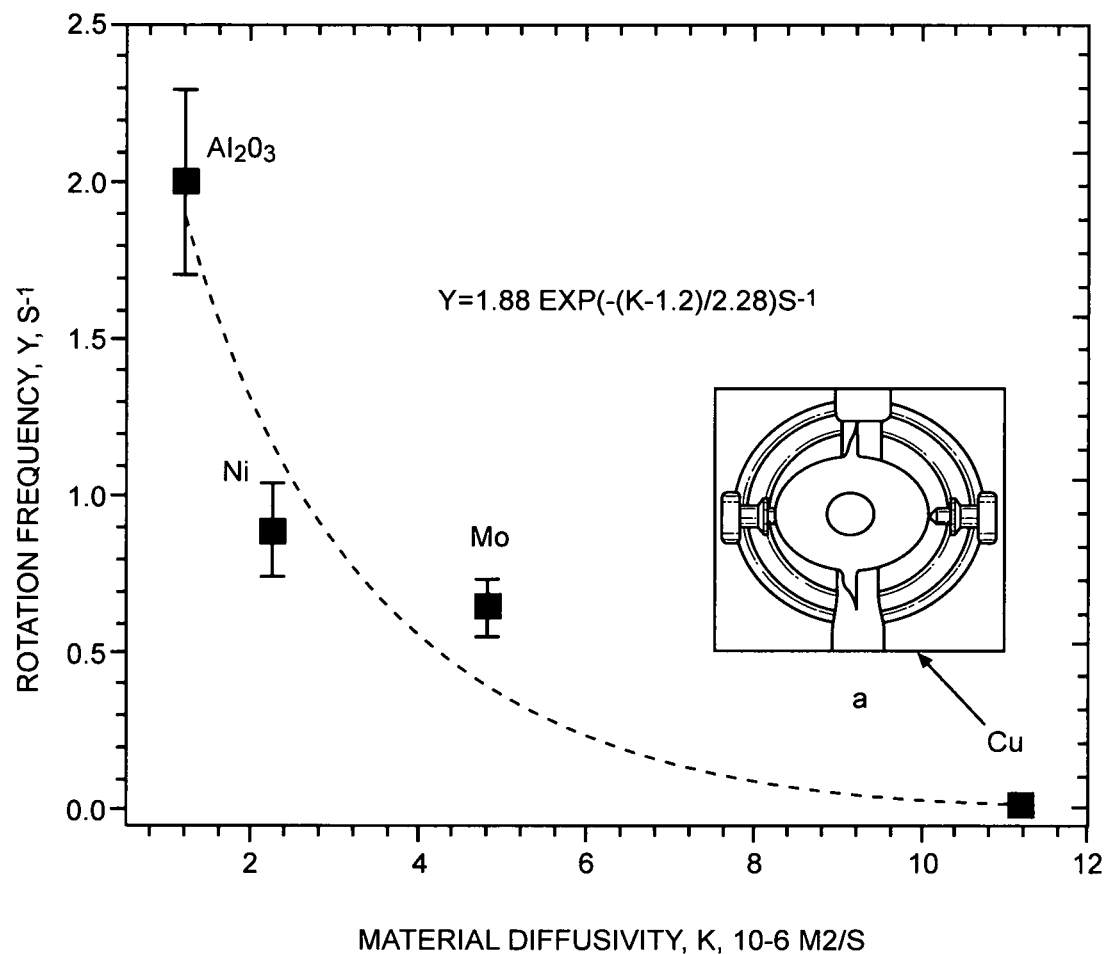
FIG. 11 is a graph of material diffusivity versus rotation frequency estimates for a spherical shape reactor for data obtained with laser heating on a rotating reactor.

The inventor in his estimates uses the thermal diffusivity vs. thermal conduction as a measure of how fast the heat propagates in a material. In specific cases (see Table 2 and FIG. 11), reactors of a spherical shape shell and with a 0.15 mm wall thickness are considered. The reactor is heated with two laser beams from opposite sides or from one side. For copper, $K=11.234\times10^{-5}$ m$^2$/s based on experiments the reactor rotation frequency is zero. FIG. 11 shows the diffusivity of the material of a spherical shape reactor versus the reactor's rotation frequency. In FIG. 11, data is plotted for the situation where two opposite sides of a reactor are heated with laser beams. The image at the lower right end of the graph is a photograph of an actual Cu spherical reactor with laser heating on two opposite sides. For Cu, the temperature uniform distribution is achieved due to higher diffusivity and with no rotation. For $Al_2O_3$, a rotation of 2 Hz brings the material into a thermal diffusivity of approximately 1.20, sufficient for providing a uniformity of heating for RHTR use, plus it brings a higher melting point temperature of 1,700-2,000° C. This enables RHTR measurements to be made at still higher temperatures by application of the proven concept of reactor rotation during heating.

TABLE 2

Material characteristics of thermal diffusivity and melting point

| Material | Thermal diffusivity, K, $10^{-5}$ m$^2$/s | Melting point, T, ° C. |
| --- | --- | --- |
| Copper (Cu) | 11.23 | 1,085 |
| Molybdenum (Mo) | 4.79 | 2,623 |
| Nickel (Ni) | 2.27 | 1,455 |
| Aluminum Oxide, ($Al_2O_3$) | 1.20 | 1,700-2,000 |

Table 2 presents a selection of different reactor materials that balance RHTR test competing requirements. Benefits of these materials are: rapid heating, uniform and higher temperatures, resistance to attacks by all common reagents and they can be tested in both oxidizing and reducing atmospheres. For instance $Al_2O_3$ (alumina) can be a choice with a rotating reactor. It absorbs 1.06 μm of a laser beam and is usable in both oxidizing and reducing atmospheres up-to 2000° C.

A typical rotation frequency is 1 Hz, or in a range of from 0.5-3 Hertz, to gain the necessary degree of heat conduction throughout a reactor constructed of an $Al_2O_3$ ceramic.

Method of Restoring a Reactor's Surface

Figure 12:
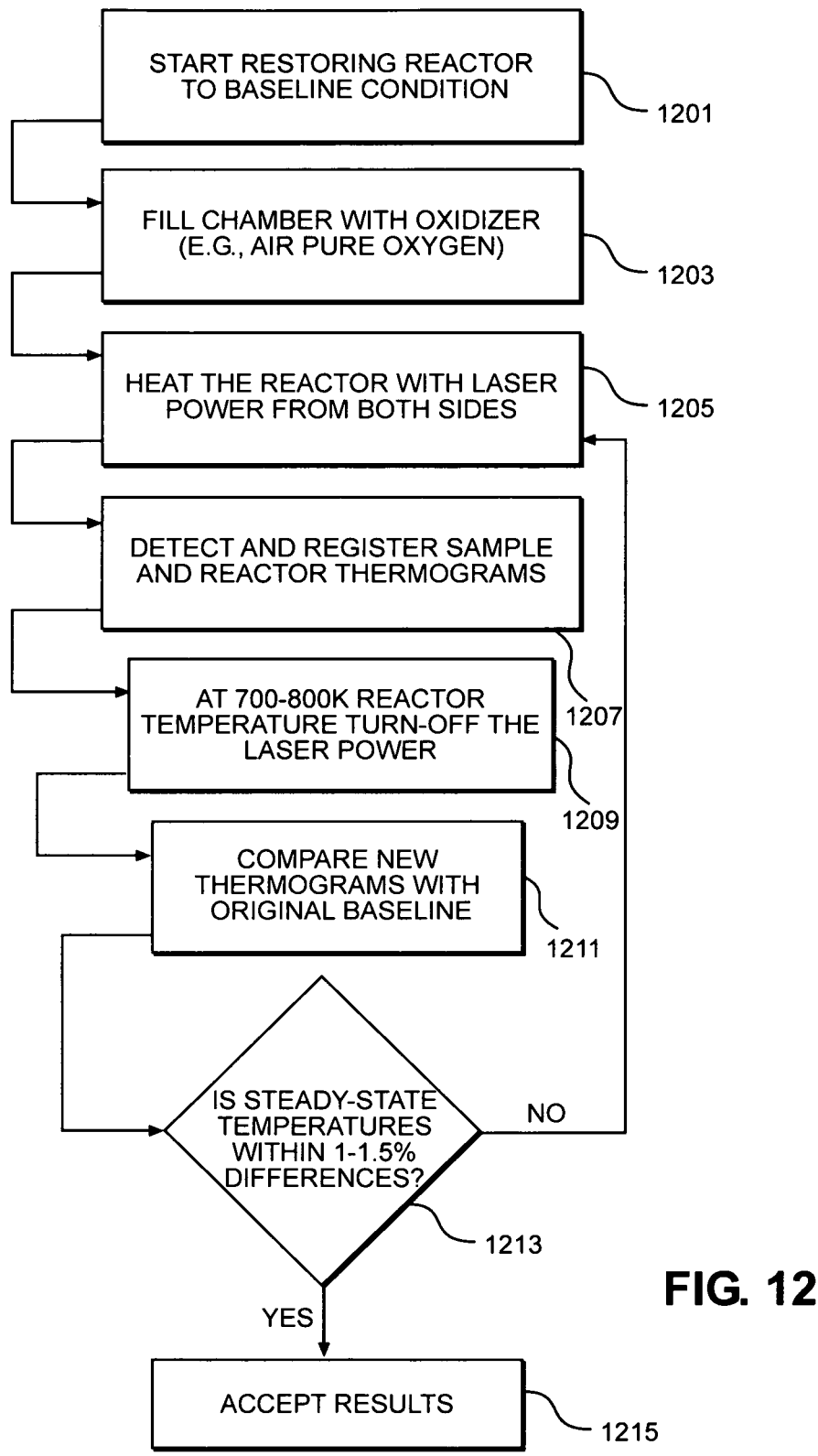
FIG. 12 is a flowchart showing a method for restoring the surface of the reactor and substrate back to the original oxidized-baseline condition.

As a result of repeated TA processes, the RHTR reactor's outer surface becomes covered with a copper oxide that, detrimentally, absorbs the laser beam. In the course of using the RHTR and its methods, it was observed that after a series of thermal analysis runs, at times the baseline had changed. The baseline is the thermogram of the reactor with only the substrate, and no sample, inside. Upon further investigation of this changing baseline, and after conducting more laboratory tests, the inventor eventually discovered that the results with fuels indicated that the modification of the baseline is attributed to the copper oxide residue that builds up on the reactor sphere's outer and inner surfaces and on the surface of the substrate after completion of a number of thermal measurements runs. Of course a changed baseline, i.e. an inaccurate and inconsistent baseline, negatively affects the entire data compilation process. Thus, a significant improvement for greater precision and accuracy of the measurements is the realization that the sphere must be restored (re-oxidized) in air using the laser prior to any sample or baseline measurement. FIG. 12 is a flowchart of the method for restoring the surfaces of the reactor and substrate back to the original oxidized-baseline condition.

The novel process of re-oxidizing applies to both the reactor's (1) inner surface, and (2) outer surface. However, because a major focus of concern is about laser absorption by copper oxide, an emphasis in the re-oxidizing is on the outer surface.

As to observable colors, copper oxide CuO is dark gray, with higher laser absorption. Cupric oxide $Cu_2O$ is reddish, with lower laser absorption. The reddish color occurs due to the interaction the reactor has with some corrosive materials e.g. ammonium nitrate, so it is necessary for accuracy to re-oxidize any reddish surface back to copper oxide i.e., CuO with the dark gray color.

With reference to FIG. 12, the restoration of the surface of the reactor and the substrate back to their original oxidized-baseline condition starts with step 1201 to restore the reactor to its baseline condition. This restoration applies to the reactor's inner wall surface and the substrate's surfaces, and also to the reactor's outer wall that should have a CuO layer on it. In step 1203, the chamber is filled with an oxidizer, such as air or pure oxygen. Then in step 1205, the reactor is heated with laser power from both sides, i.e. from two opposing sides. Then, in step 1207, the system detects and registers thermograms for the sample and for the reactor as the reactor is heated. When the temperature reaches a pre-determined temperature set as a temperature between about 700-800 degrees K., for example, the laser power is turned off in step 1209. The new thermograms are then compared with the original baseline in step 1211. In step 1213, if the steady-state temperatures are within 1-1.5% difference, then the user accepts the results at step 1215. If the steady-state temperatures are not within the 1-1.5% difference, then the method goes back to step 1205 and proceeds through steps 1205, 1207, 1209, 1211, and 1213 again.

When the sphere's outer surface is not re-oxidized back to CuO (so to have a dark grey appearance), this adversely affects (e.g., changes the laser power absorption by the reactor surface) any measurement carried out. If the oxide layer changes to $Cu_2O$ (with a reddish appearance), then the thermal behavior of the sphere changes in a similar manner to reducing the laser power. Formation of CuO occurs between 673 K and 973 K with $Cu_2O$ appearing at higher temperatures and often in the presence of a corrosive material, such as ammonium nitrate. Thus, accuracy of the determination of the sample's thermal behavior (e.g., exothermic, endothermic) may be affected by its dependence on the temperature difference between the sample and the baseline thermograms. One must therefore ensure that the sphere is pre-oxidized before each measurement to remove any residue on the sphere and substrate surfaces, as well as reform the CuO layer on the outer sphere surface. This was the case in these experiments, for which the sphere surface was reheated to 773 K and re-oxidized at ambient conditions.

Figure 14A:
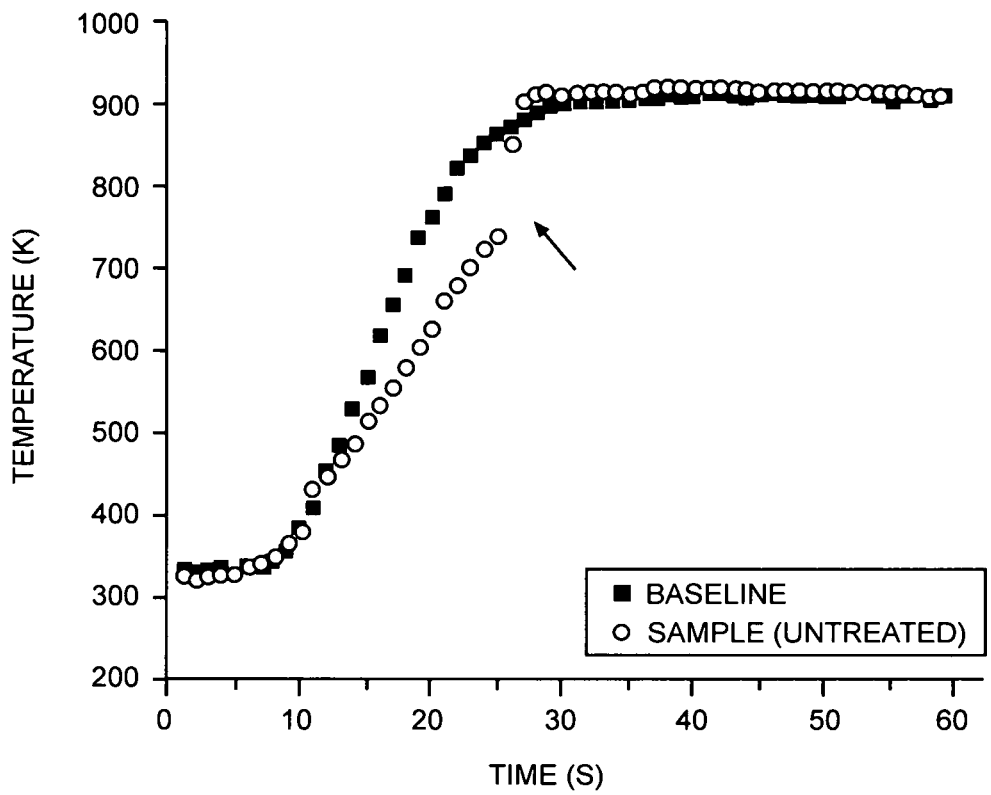
FIG. 14 (a) is a graph showing a RHTR thermogram produced from measurements of a high-level organic waste in an untreated state.
FIG. 14(b) is a graph showing an RHTR thermogram produced from measurements of a high-level organic waste in a pre-dried state.
Figure 14B:
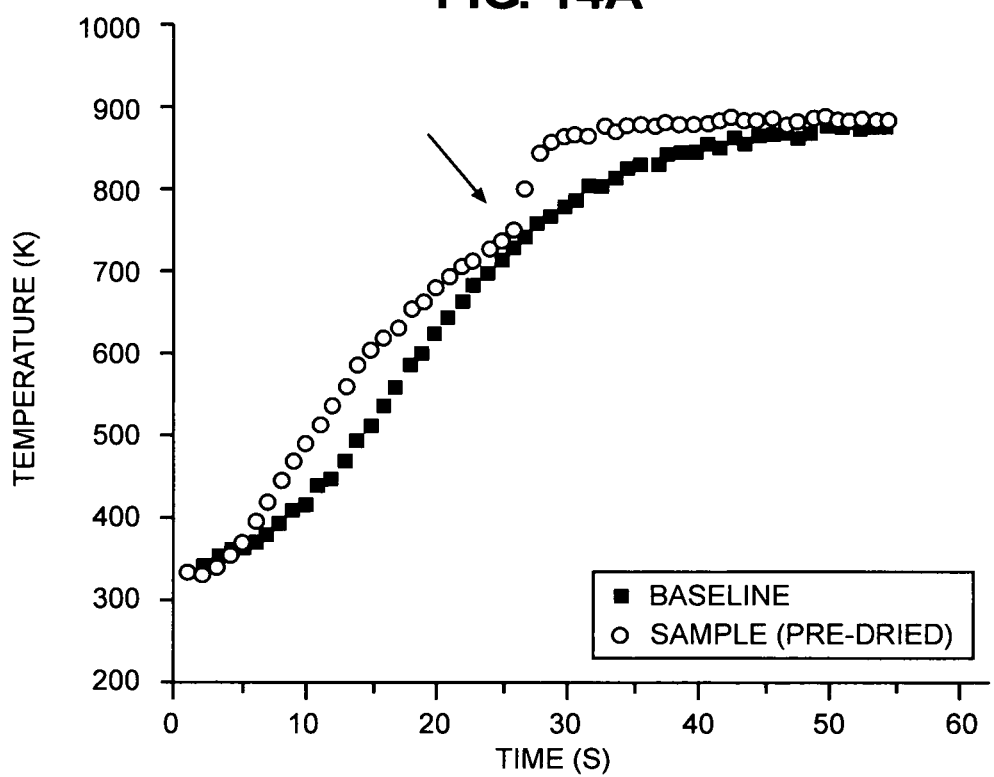

FIGS. 14 (*a*) and (*b*) present RHTR thermograms produced from measurements of a high-level organic waste in (a) untreated and in (b) treated or pre-dried states. Measurements for the untreated waste with a mass of 14 mg were carried out at in air at 101.3 kPa, and measurements for the pre-dried waste with a mass of 14.6 mg was in argon at 8.1 kPa. Note that the pascal (Pa) or kilopascal (kPa) is a unit of pressure measurement widely familiar to those working in the art, widely used throughout the world and has largely replaced the pounds per square inch (psi) unit, except in some countries such as the United States where psi is the more familiar pressure measurement term. The arrows indicate the presence of an accelerated rate of heat release.

Mobile RHTR

Activity in the thermal analysis of materials as discussed herein is increasingly out of the laboratory and on-site or on-location. Examples are in conducting measurements on atmospheric aerosols captured by aircraft, on biological species at biotech facilities that do not have the thermo analysis equipment setup, and at offices or government agencies where potentially explosive materials are brought in. Handicapping this need for a mobile TA system, among other things, has been the use of mirrors in heating delivery systems, where mirrors are delicate and are subject to detrimental vibration and impurities on the reflecting surfaces, all of which goes to require that such mirrored systems be set up for permanent use in a laboratory.

Now however, with inventive features presented herein for the RHTR system, a mobile RHTR has been developed for carrying in a suitcase with quick setup, installation and use, and disassembly at a mobile location, such as in a moving vehicle, or in an office or other facility where measurements on samples are to be made, other than in a TA laboratory. The size of the reactor, as in FIG. 2*c*, and related components also photographed in FIG. 2, allow the RHTR to be positioned in a suitcase. The barrier of a mirror laser delivery system is no longer by use of the fiber optic cable direct delivery system described herein. Especially suitable for portable use is the environmental enclosure reactor associated with the multi-sample measurement system as shown in FIG. 10*a*.

This novel development of portability of a thermal analysis reactor system represents a major breakthrough in the industry and offers a more expansive use of thermal analysis to meet emerging needs in government and industry for a rapid, accurate, and yes mobile, thermal analysis reactor system.

EXAMPLES

Examples 1: Simulant High-Level Organic Waste

Figure 13:
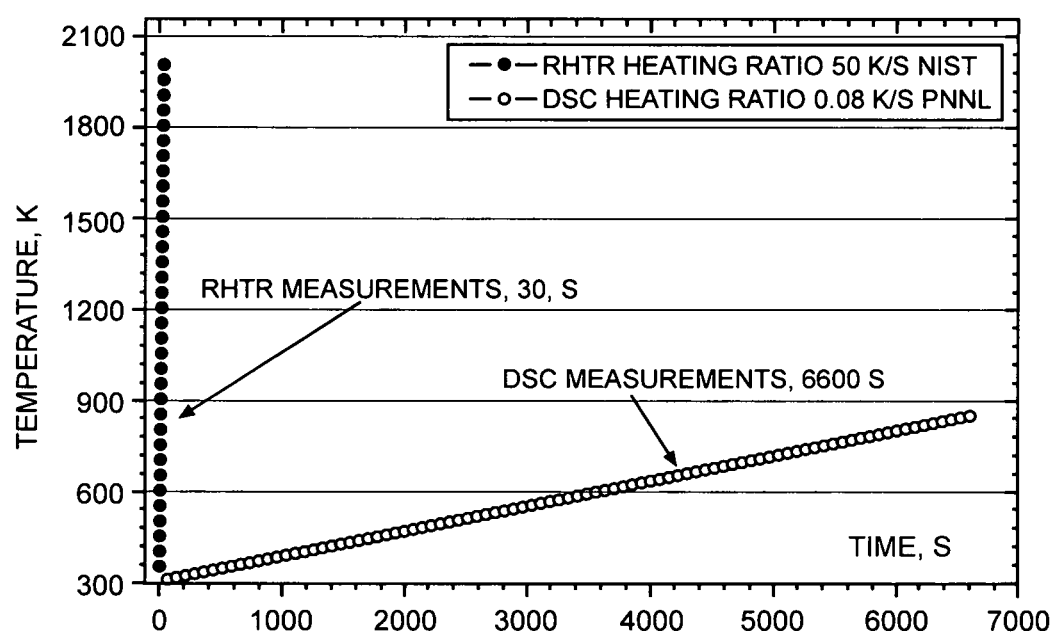
FIG. 13 is a graph that compares the measurement times of the rapid high-temperature thermal reactor (RHTR) system vs. differential scanning calorimetry (DSC)

FIG. 13 shows two graphs of temperature versus time that compare the measurement times of the RHTR system with the measurement times of the differential scanning calorimetry (DSC). These were generated from experiments carried out with a simulant hazardous organic waste to demonstrate beneficial features of using the improved RHTR with one or more of the inventive features described herein as compared to conducting a thermoanalysis using the conventional DSC method.

A waste material is used in this comparison test. In the real world, when waste is accumulated, an organic material or perhaps sodium nitrate is put on top of the waste to mitigate certain corrosive effects. The waste material used in this exemplary test is actually associated with a nuclear waste. For safety and other factors, the test should not be done on the nuclear side, so we used just the chemical stimulant to lo$^{ok}$ for the energy that might be contained therein. Over years of storage, a certain composition evolves in the material. In this example, under a composition analysis after years of storage, the waste under examination was found to consist of 24 different compounds, including organics, solvents, sodium nitrate, sodium nitrite, additives, and inorganics. These are as listed in Table 3.

TABLE 3

Chemical composition of the simulant organic waste.

| No. | Compound | Percent Weight |
|---|---|---|
| 1 | NaOH | 31.48 |
| 2 | $NaNO_2$ | 7.39 |
| 3 | $NaC_2H_3O_3$ sodium glycolate | 7.10 |
| 4 | Na 3HEDTA | 5.57 |
| 5 | Na 4EDTA | 3.41 |
| 6 | Na 3citrate•$H_2O$ | 1.94 |
| 7 | $Na_2C_4H_4O_6$•$H_2O$ sodium tartrate | 0.54 |
| 8 | Na D2EHP | 0.70 |
| 9 | Tributyl phosphate | 0.35 |
| 10 | NPH ($C_{12}H_{26}$) | 3.75 |
| 11 | $Fe(NO_3)_3$•$6H_2O$ | 4.58 |
| 12 | $Cr(NO_3)_2$•$9H_2O$ | 0.08 |
| 13 | $Ni(NO_3)_2$•$6H_2O$ | 0.12 |
| 14 | $Ca(NO_3)_2$•$H_2O$ | 0.22 |
| 15 | $Mn(NO_3)_2$ | 0.05 |
| 16 | $Na_2SiO_3$•$9H_2O$ | 0.14 |
| 17 | $NaNO_3$ | 15.40 |
| 18 | $Pb(NO_3)_2$ | 0.41 |
| 19 | Zr (citrate) | 0.01 |
| 20 | $Na_2SO_4$ | 8.72 |
| 21 | $Na_3PO_4$•$12H_2O$ | 0.48 |
| 22 | $NaAlO_2$•$0.21NaOH$•$1.33H_2O$ | 1.24 |
| 23 | NaF | 0.00 |
| 24 | $H_2O$ | 6.30 |
| | Total | 100.00 | where:
HEDTA is Hydroxyethyl ethylenediamine triacetic acid;
EDTA is Ethylenediaminetetraacetic acid; and
D2EHP is Di-2-ethylhexyl phthalate;
NPH—Normal paraffin hydrocarbon.

The importance of knowing the energy contained in a material at a given temperature is of critical importance. One example of the sort of problem being where is the concern of would happen if lighting were to strike an underground storage tank. This concern applies as well to other situations, such as involving above-ground tanks and strikes other than from lighting. In the event of any such interaction, a runaway explosive type of process might occur because the substances have an organic material or an oxidizers or the like; hence, there is concern that something can explode and release nuclear materials in the surrounding environment. The crux of this scenario is that the explosion would occur due to, or with, a very rapid increase in temperature. Yet this is not detectable by conventional methods such as DSC because they are not designed for rapid and extreme temperature changes. Just the opposite, most conventional thermoanalysis is based on a constant or small change of temperature, unlike occurrences that happen in the real world.

Prior to conducting the test, the reactor sphere was restored (re-oxidized) in air using the laser prior to any sample or baseline measurement. This re-oxidization, as discussed above, insured more accurate measurements by removing any residue on the sphere and substrate surfaces, and by reforming the CuO layer on the outer sphere surface. Measurements were then taken to generate thermograms as described earlier. Results were compared between the simulant untreated waste and a sample of the waste pre-dried in a vacuum oven at room temperature for two days. The RHTR measurements were carried out at different heating rates and steady state sample temperatures.

FIG. 13 shows two graphs of temperature versus time that compare the measurement times of the rapid laser thermal reactor (RHTR) system vs. differential scanning calorimetry (DSC). The comparison of FIG. 13 shows that the heating rate with RHTR is almost instantaneous (actually taking 20-30 seconds) in achieving a high temperature, while DSC is spread out over time linearly and is able to reach only a much lower temperature before sample disintegration or the sample's characteristics becoming modified.

The object was to find out how much energy exists in this mixture of the 24 different compounds. The DSC results indicated no exothermal energy release. This is shown in FIG. 13 by graph line 1301 which shows that it takes approximately 6600 seconds for the sample to reach a maximum temperature of approximately 810 deg. K. This gives a DSC heating rate of only 0.08 deg. K/s. The sample is unable to reach the triggering temperature, i.e. the temperature that triggers an explosion—an energy release, because the sample's properties have changed at a much lower temperature due to the prolonged heat imposed on the sample. The result is the operator cannot see the real energy inside of that sample. At the DSC's slow heating rate, by the time the sample reaches its steady state (or "equilibrium") point, where the temperature levels off despite the additional passage of time, the sample is pretty much changed or modified in its behavior due to the heating effects over that much time on the sample. The sample material would then be useless for any further evaluation beyond the DSC's maximum test temperature, which is its steady state temperature.

Measurements were carried out in the RHTR system at a laser heating rate between 30 deg. K/s and 40 deg. K/s, as shown by graph line 1305 in FIG. 13. This fast heating rate allows for the evaluation of this waste at high temperatures, i.e., at steady-state temperatures reaching beyond 1900 deg. K, with a minimum or negligible loss of sample's (simulant's) volatile species in spite of the high temperature because the heating occurs so quickly, simulating the real world condition of a fast temperature rise due to some occurrence. It takes about 20-30 seconds for the RHTR to reach the sample's steady state temperature, with it understood that the exact number of seconds depends on the mass and other details of the sample under test.

Contrary to the DSC method that showed no exothermal energy release, the RHTR method produced results show an exothermic release of energy (heat release) of 3 megajoules per kilogram (MJ/kg). Significantly, the RHTR study uncovered that competing endothermic (decomposition) and exothermic (explosive) processes were present; (More detail with plotted graphs on this is presented in FIGS. 15 and 16). For example, it was determined that sodium nitrate and sodium nitrite may decompose at 653K and 593K, yet they may explode at 810K. Using the DSC approach with a heating rate of 0.08K/s did not detect any exothermic reaction because the reactants in the sample either vaporized completely or the sample's behavior was modified by the time the sample reached 810K, thus leading to an erroneous and potentially dangerous assessment of the material's characteristics.

FIGS. 14(a) and (b) present RHTR thermograms produced from measurements of a high-level organic waste in (a) untreated and in (b) treated or pre-dried states. Measurements for the untreated waste with a mass of 14 mg were carried out at in air at 101.3 kPa, and measurements for the pre-dried waste with a mass of 14.6 mg was in argon at 8.1 kPa. Note that the pascal (Pa) or kilopascal (kPa) is a unit of pressure measurement widely familiar to those working in the art, widely used throughout the world and has largely replaced the pounds per square inch (psi) unit, except in some countries such as the United States where psi is the more familiar pressure measurement term. The arrows indicate the presence of an accelerated rate of heat release. In FIGS. 14 (*a*) and (*b*), the dashed line is a curve fit to indicate how the data might evolve if the process remained endothermic.

Results from FIG. 14(*a*) where the sample is untreated organic waste shows it took about 30 seconds to reach its steady state at a temperature of approximately 950 deg. K. This is compared against a baseline measurement, which is a measurement of the reactor without the sample, in this case, without the organic waste. The data shows a good tracking between the baseline and the sample measurement in that both reach steady state in approximately 30 seconds and at the same estimated temperature of 950 deg. K. This ability to test at the elevated temperatures allows for the collection of data that, when used in the heat loss equations infra, produces as one conclusion that sodium nitrate and sodium, nitrite may decompose at 653K and 593K, yet they may explode at 810K.

Results from FIG. 14(*b*) where the sample is pre-dried waste shows that the sample reaches its steady state temperature again at approximately 30 seconds while the baseline reached steady state later at approximately 50 seconds. The steady state temperature for the pre-dried waste is at approximately 900 deg. K., a little lower than that of the untreated organic waste. The heat release of 3 MJ/kg that was discovered using RHTR is equivalent to the surface area, the one between the white circles and the solid baseline, in FIG. 14(*b*). This surface area is the energy part, the positive part. The heat release is calculated from FIG. 14 (*b*) and using the energy release-heat loss equation presented earlier.

The equilibrium point or steady state is seen to be a little different for the two samples, with the untreated waste's equilibrium at about 940 deg. K and the treated waste's equilibrium a little less at about 880 deg. K.

Thus by the RHTR being pre-oxidized at the start (pre-oxidized and re-oxidized used interchangeably herein) and by using a rapid temperature rise from the optic cable delivery system with a single or multi-wavelength laser system, the change in temperature moves faster. Measurements from the graphs of FIGS. 13-14 show that even when the sample is dried out, a positive kind of jump, an energy release, is seen. Energy release as used herein is when there is some chemical combustion or explosion, a positive kind of thing. There is also a jump in the wet version, undried and untreated basically, but a slightly less amount of energy is measured this being due to moisture evaporation, which takes away some of the energy.

In FIG. 14 (*a*), released energy is measure by the curve for the sample (open circle symbols) and it is above the baseline (black square symbols) at the steady state temperature. The difference in the two curves in FIG. 14 (*a*) is less than that in FIG. 14 (*b*). So the two RHTR curves show, because of the difference or the space between the two curves, that there is a triggering energy release, an explosive reaction, proportional to the space between the two curves, in the sample material at a certain temperature, and the DSC method misses it because it cannot test at the higher temperatures.

Example 2: Forensics of Homemade Explosives (HME)

Criminals and terrorist groups use HMEs because of the widespread availability of the required chemicals. Reliance on easy accessibility of the precursor compounds means HME mixtures differ widely in their chemical composition and formulation/synthesis procedures. This variability presents a formidable challenge for forensic processing and analysis. Currently, the forensic examination of the pre-/post-blast physical evidence lacks specificity for HME identification.

RHTR provides in-situ quantitative measurement of various relevant thermophysical and chemical properties with greater speed and accuracy, including the sample's temporally resolved thermograms. As indicated, DSC and other conventional thermal analysis techniques (e.g., differential thermal analysis, DTA) are appropriate for temperature levels up to 800 K and heating rates up to 0.1 K/s. For improvised explosive mixtures applications, due to the low heating rates of conventional methods, chemical processes detrimental to the sample might occur before the desired temperature level is achieved. The recorded data are therefore not representative of the thermal behavior of the sample at actual process conditions, skewing the analysis. Also, conventional methods do not directly account for the heat transfer (thermal loss) from tested samples, significantly affecting the accuracy of the data. Conventional techniques have been found to mask thermal characteristics that occur at higher-temperatures, and non-equilibrium situations (i.e., an explosion), because of material decomposition. Instead, high heating rates must be used to reach the required temperatures before detrimental material decomposition and potential chemical reactions can occur. FIG. 13, showing comparison graphs of temperature versus time between RHTR and DSC and discussed supra, illustrates RHTR as a faster, more cost effective analysis than current methods by 200 fold.

RHTR measurements were carried out with the most commonly used homemade explosive (HME) materials, i.e., ammonium nitrate/nitromethane and ammonium nitrate/No. 2 diesel fuel oil, for different compositions, initial masses, and steady-state temperatures, along with the effects associated with HME aging. FIGS. 15 (*a*)-(*c*) plot thermal signatures of samples under different conditions and FIG. 15(*d*) plots energy release versus mass fraction %. FIG. 15 (*a*) shows a comparison of thermal signatures for ammonium nitrate (AN) using the RHTR approach versus the DTA approach, and portrays the 160× higher signal-to-noise ratio that leads to the RHTR's improved accuracy.

In FIG. 15(*a*), the RHTR thermal signature 1501 is presented as the larger of the two graphs while the DTA thermal signature 1503 is presented for viewing more compressed inside the RHTR thermal signature graph. The arrow 1505 extends from a peak temperature of approximately 415 deg. K. and is pointed at the DTA graph, to indicate that DTA ran on the x-axis temperature scale only from 0 to approximately 415 deg. K, as compared to the RHTR graph that was able to conduct a fast run from 0 to approximately 950 deg, K. without sample degradation.

Conclusions from FIG. 15(*a*) are that the ammonium nitrate thermal signature is significantly more identifiable with RHTR. Clearly identifiable is the phase transition (PT) 1507, the melting point (MP) 1509, the boiling point (BP) 1511, and thermal decomposition (TD) 1513 temperatures/points. Less identifiable and hence less precise are the same points in the thermal signature using the DTA approach. This is in addition to DTA not being able to test the sample beyond approximately 415 deg. K, leaving unknown what potential explosive effects might exist at the higher temperatures.

FIG. 15 (*b*) shows plots for a variation of the sample temperature-time derivative with sample temperature for stoichiometric ANNM (i.e., 29% NM/ANNM) and the baseline (i.e., the temperature change for the system without the sample). Various parameters ($\Delta T_i$ and $\Delta(dT/dt)_i$, i=1, 2) are defined that are based on the derivative extrema (1—lower-temperature maximum derivative, 2—mid-temperature minimum derivative, and 3—higher-temperature maximum derivative).

FIG. 15 (c) shows plots for variation of ANFO sample temperature-time derivative with sample temperature for different days as the sample aged (mass was 2.0 mg±0.2 mg). Aging of the HME results in a preferential vaporization of the fuel volatile hydrocarbon fractions and a reduction of the HME potency.

FIG. 15 (d) shows a plot of the variation of ANFO energy release with FO/ANFO mass fraction. The dashed line represents the reference value from the literature. The error bars represent the estimated expanded uncertainty for the ANFO energy release, as determined by the Type A evaluation of uncertainty.

Table 4 presents calculated changes in enthalpy for some known ammonium nitrate chemical reactions during thermal decomposition. The RHTR measured value for ammonium nitrate thermal decomposition is 2.1 kJ·g-1.

by investigating the liquid vaporization effects on sample mass, which is important information for HME forensics analysis.

3. RHTR measurements with ANFO also demonstrated sensitivity of the technique to fuel hydrocarbon volatility. Considering the preferential vaporization (i.e., evaporation of the more-volatile lighter hydrocarbon fractions at a faster rate than the heavier fractions due to their higher vapor pressure) of ANFO hydrocarbon fractions, sample aging reduces the probability of ignition/reaction, thus reducing HME explosive capability. By monitoring changes in fuel mass due to evaporation, one can better define the mixture preparation conditions (i.e., over what period of time must HME mixtures be prepared). Such information is important for HME forensics analysis.

Example 3: Climate Change Applications

The Climate Change Mathematical Models used by government agencies and industries use absorption properties of aerosols to assess their (i.e., the aerosols') impact on climate. Absorptivity measurements in the infrared range with

TABLE 4

Calculated change in enthalpy

| No. | Reaction | Calculated enthalpy change [kJ · g$^{-1}$] | Reference/Comment |
|---|---|---|---|
| 1 | $2NH_4NO_{3(s)} \rightarrow 4H_2O_{(g)} + 2N_{2(g)} + O_{2(g)}$ | 1.474 | Standard state (298.15 K) |
| 2 | $NH_4NO_{3(s)} \rightarrow 2H_2O_{(g)} + N_2O_{(g)}$ | 0.455 | Standard state (298.15 K) |
| 3a | $NH_4NO_{3(s)} \rightarrow 2CH_3NO_{2(l)} \rightarrow 5H_2O_{(g)} + 2N_{2(g)} + 2CO_{(g)}$ | 10.5 | Standard state (298.15 K) |
| 3b | $NH_4NO_{3(s)} \rightarrow 2CH_3NO_{2(g)} \rightarrow 5H_2O_{(g)} + 2N_{2(g)} + 2CO_{(g)}$ | 11.3 | Standard state (298.15 K) |
| 4 | $NH_4NO_{3(s)} \rightarrow NH_{3(g)} + HNO_{3(g)}$ | 2.120 | Standard state (298.15 K) |
| 5 | $NH_4NO_{3(s)} \rightarrow NH_4NO_{3(g)}$ | −1.687 | Standard state (298.15 K) |
| 6 | $NH_4NO_{3(s)} \rightarrow 2H_2O_{(g)} + N_{2(g)} + O_{(g)}$ | 1.639 | J. Akhavan, The Chemistry of Explosives. 2006 |

Figure 15A:
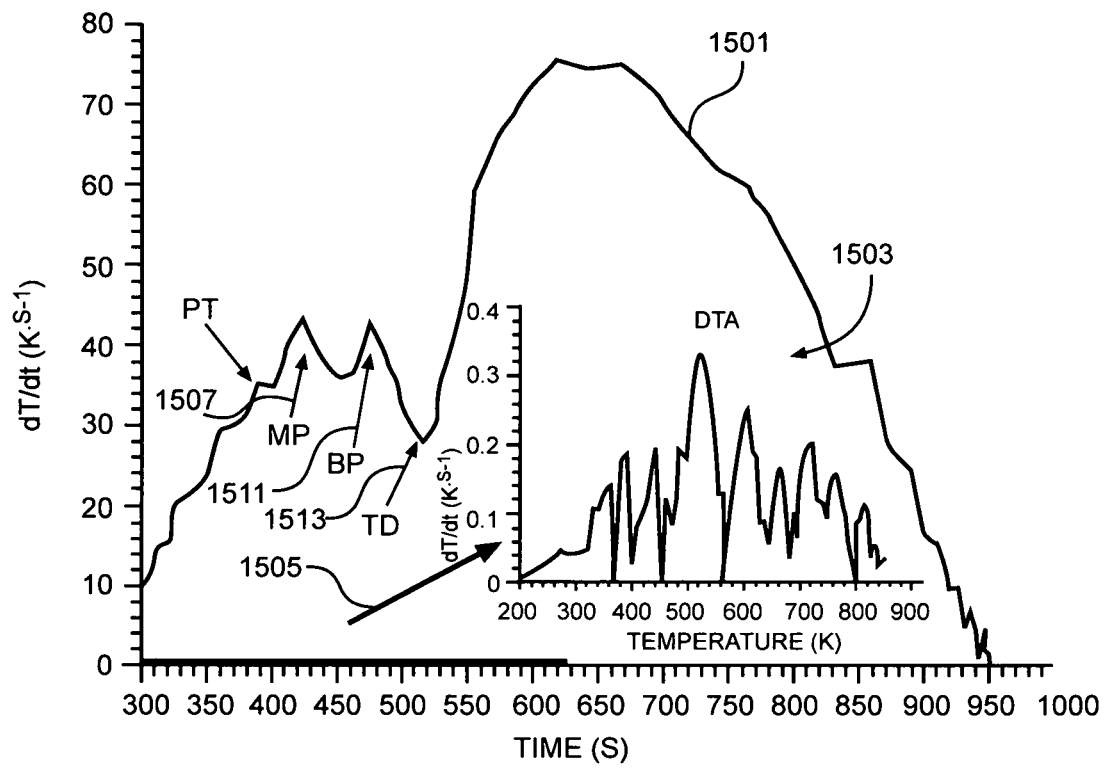
FIG. 15(a) is a graph of thermal signatures of samples under different conditions.
Figure 15B:
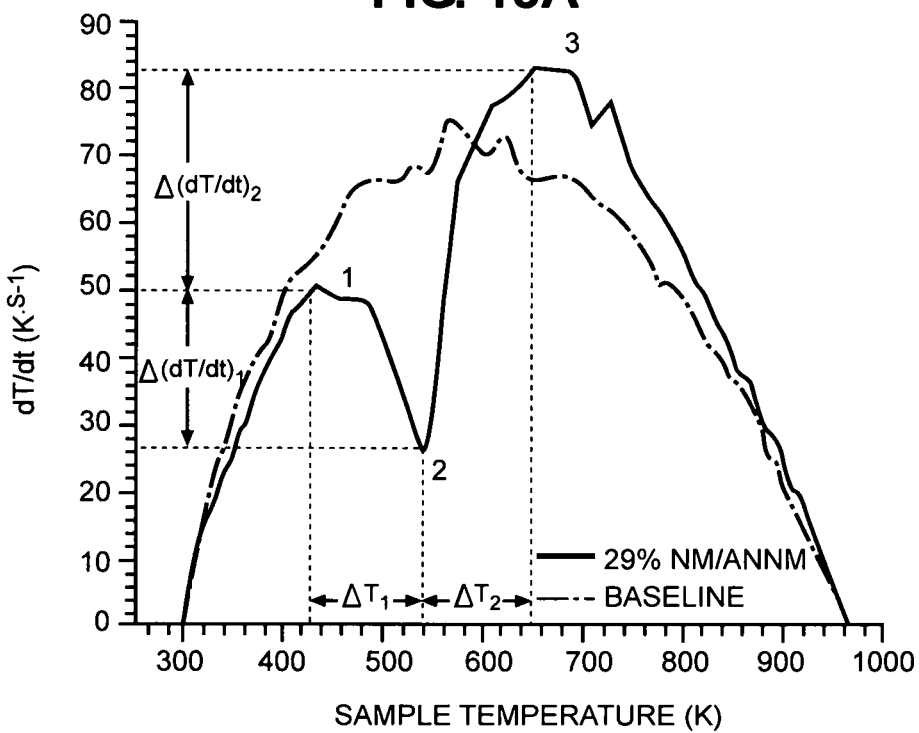
FIG. 15(b) is another graph of thermal signatures of samples under different conditions.
Figure 15C:
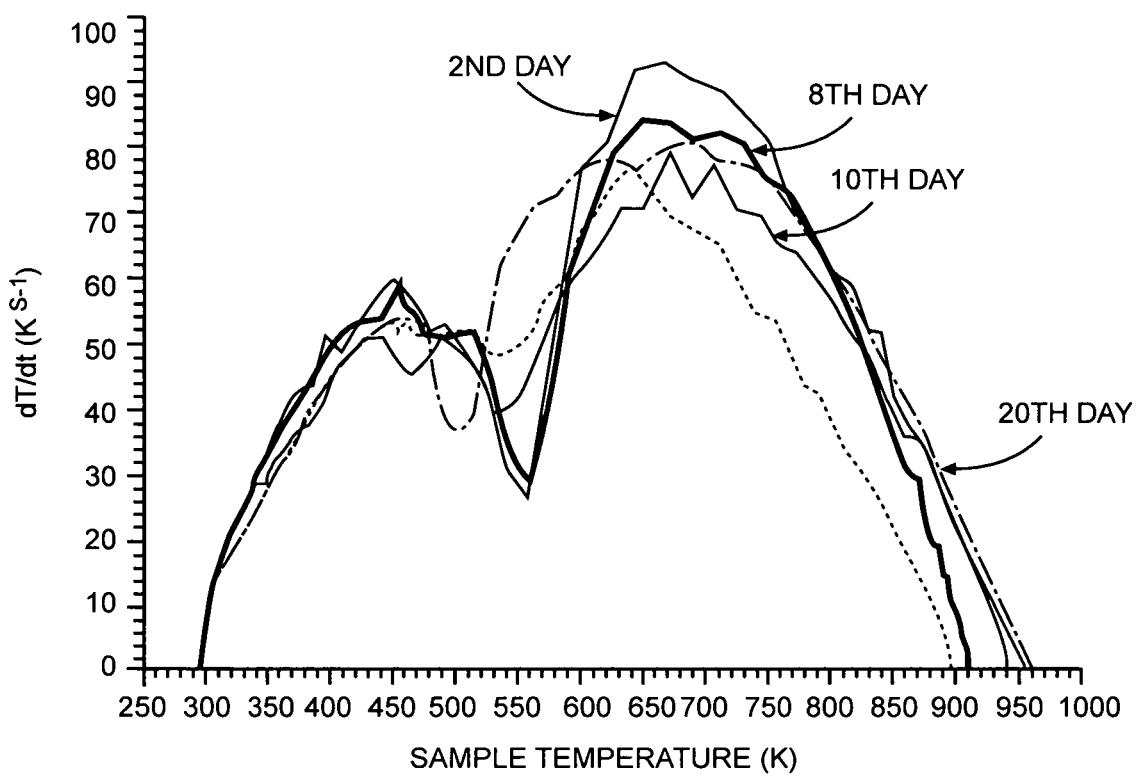
FIG. 15(c) is yet another graph of thermal signatures of samples under different conditions.
Figure 15D:
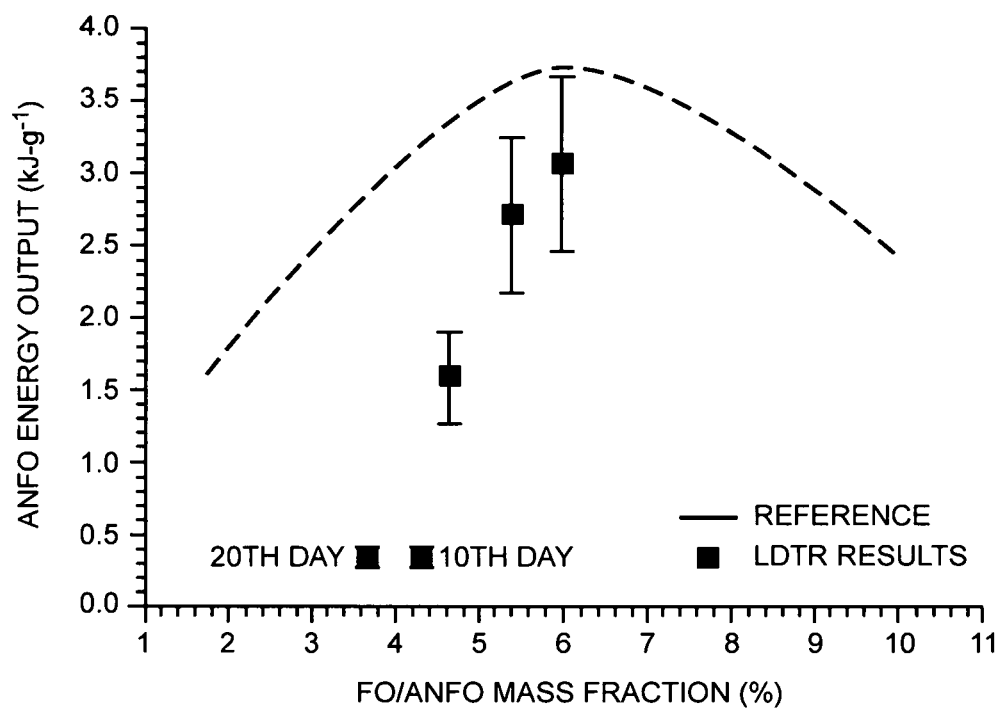
FIG. 15(d) is a graph of energy release versus mass fraction percent.

It has been shown that the RHTR heating rate is about 200 times faster than the DSC and differential thermal analysis (DTA) approaches (see FIG. 13). It has also been established that the RHTR results also denote clearly important thermal-related features for AN, such as phase transition, melting, boiling, and thermal decomposition temperatures (see FIG. 15(a) showing typical AN thermal signatures from the RHTR and DTA approaches). RHTR higher resolution of the unique points has significantly increased forensic identification confidence.

The data thus establishes RHTR to be a valuable diagnostic tool for characterizing the thermal and chemical behavior of HME materials. Results are summarized as follows:

1. The thermograms for the mixed ANNM were different than the individual components, indicating a sensitivity of the RHTR technique to varying HME composition. The signatures also varied for different operating conditions (steady-state temperature, sample mass and fuel/mixture mass fraction). Choosing the temperature-time derivative of the thermal-signature curves is useful in augmenting changes in ANNM thermogram features.

2. One can better define mixture preparation conditions (i.e., over what period of time must HME mixtures be prepared)

the RHTR at ambient (laboratory) conditions were carried out on particle-laden filters from a three-wavelength (visible) particle/soot absorption photometer (PSAP). The particles were obtained during the Biomass Burning Observation Project (BBOP) field campaign.

The focus of this study was to determine the particle absorption coefficient from field-campaign filter samples using the RHTR approach, and compare results with other commercially available instrumentation (e.g., Particle Soot/Absorption Photometer (PSAP)). Advantages of the RHTR approach include 1) measurement of material absorption directly, 2) information on the filter optical properties, and 3) identification of the filter material effects on particle absorption (e.g., leading to particle absorption enhancement or shadowing).

For measurements carried out under ambient conditions, the particle absorptivity is obtained with a thermocouple placed flush with the filter back surface and the laser probe beam impinging normal to the filter particle-laden surface. Thus, in principle one can employ a simple experimental arrangement to measure simultaneously both the transmissivity and absorptivity (at different discrete wavelengths) and ascertain the particle absorption coefficient.

For this investigation, RHTR measurements were carried out with PSAP filters (pairs with both blank and exposed filters) from eight different days during the campaign, having relatively light but different particle loadings. The observed particles coating the filters were found to be carbonaceous (having broadband absorption characteristics). The RHTR absorbance compared well with results from both the PSAP (Table 5). The theoretical analysis was also expanded to account for the filter fiber scattering on particle absorption in assessing particle absorption enhancement and shadowing effects. The results indicated that absorption enhancement effects were significant, and intensified with decreased filter particle loading.

profiles (sample temperature). FIG. 16 (D) shows a comparison of the sample and baseline derivative profiles (reactor temperature), for B100 fuel at different chamber pressures.

A change in the baseline (after reaction of the sample) was attributed to deposition of condensable vapor and coating of unreacted residue on the reactor and substrate surfaces, and a change in the oxide layer on the reactor sphere outer surface, which affected measurement uncertainty. Nevertheless, the results remained consistent with distillation curve work reported in the literature. This study demonstrates that

TABLE 5

Summary of the BBOP particle absorption coefficients from the PSAP and RHTR.

| | | Particle Absorption Coefficient, [Mm$^{-1}$] | | | |
|---|---|---|---|---|---|
| Observed | | PSAP$^\ddagger$ | | | RHTR* |
| Filter No. | Loading | $\lambda$ = 462 nm | $\lambda$ = 523 nm | $\lambda$ = 648 nm | $\lambda$ = 1064 nm |
| 1 | Heaviest | 30.53 | 24.76 | 18.08 | 11.81 ± 0.01 |
| 2 | Lighter | 13.89 | 12.35 | 10.03 | 6.53 ± 0.01 |
| 3 | Lighter | 12.19 | 10.46 | 8.11 | 5.62 ± 0.01 |
| 4 | Lighter | 15.87 | 11.77 | 7.55 | 4.91 ± 0.01 |
| 5 | Lighter | 9.67 | 8.22 | 6.33 | 4.74 ± 0.01 |
| 6 | Lighter | 10.70 | 8.19 | 5.57 | 3.99 ± 0.01 |
| 7 | Lightest | 5.11 | 4.49 | 3.55 | 2.41/2.38 ± 0.01$^\dagger$ |
| 8 | Lightest | 5.11 | 4.19 | 3.04 | 1.95/1.95 ± 0.01$^\dagger$ |

*Based on the PSAP characteristic length.
$^\ddagger$The results reported from the PSAP are the corrected values.
$^\dagger$Estimation of the uncertainty is not available because the transmissivity uncertainty was not provided with the data set.

Example 4: Petroleum Fuel and Bio-Fuel Analysis

The RHTR was used to characterize Standard Reference Material (SRM) diesel and biodiesel fuels, as well as a prototype biodiesel fuel, Various issues were associated with carrying out these measurements under different operating conditions (i.e., temperature, pressure, heating rate, and sample mass). The technique provides measurement of various relevant thermochemical characteristics; for this investigation the focus was on the sample endothermic/exothermic behavior, specific heat release rate and total specific heat release.

Results indicated that the modification of the baseline is attributed to residue remaining after completion of reactions and a change in the oxide layer of the reactor sphere outer surface. Thus, the sphere must be pre-oxidized in air using the laser prior to any sample or baseline measurement. This investigation provides a preliminary evaluation of SRM biodiesel fuels, with the results being consistent with distillation curve work reported in the literature. A laser-heating technique was used to investigate the thermochemical behavior of two soybean-based biodiesel fuels and an ultra-low-sulfur diesel fuel. The results indicated that the RHTR thermograms were different for the fuels investigated, as well as their exothermic behavior. The thermal behavior and energy release of each fuel was dependent on the preferential vaporization of the volatile fuel fractions (see FIG. 16).

FIG. 16 (A)-(D) are graphs that show comparisons of a sample with various baseline parameters; for B100 fuel at different chamber pressures.

Figure 16A:
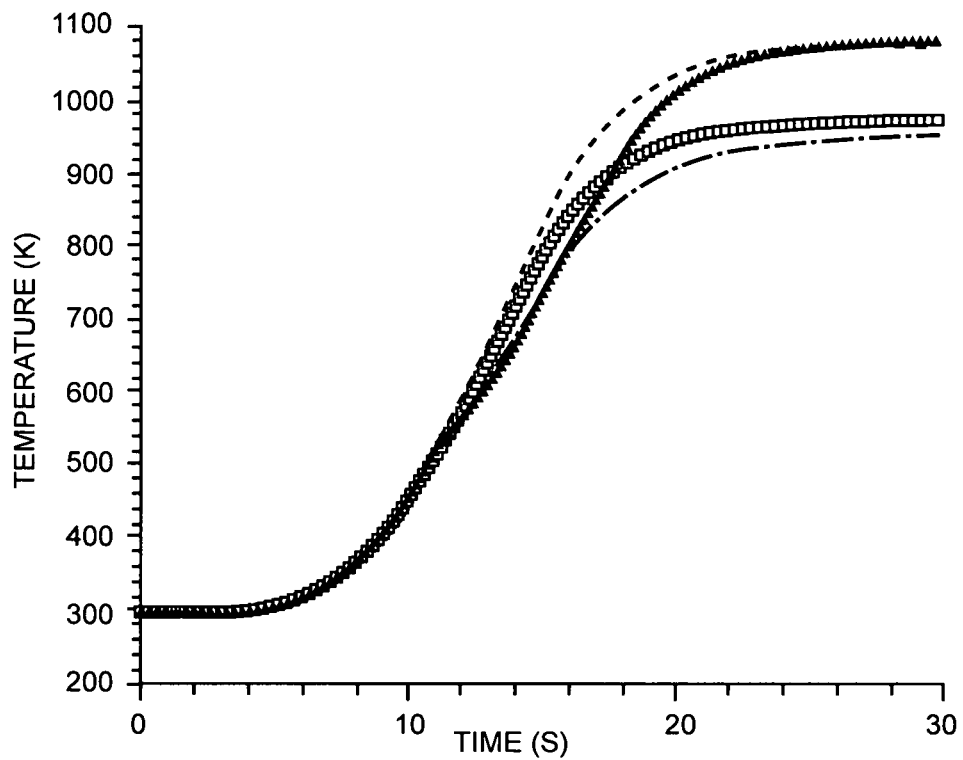
FIG. 16 (A)-(D) are graphs that show comparisons of a sample with various baseline parameters, for B100 fuel at different chamber pressures.
Figure 16B:
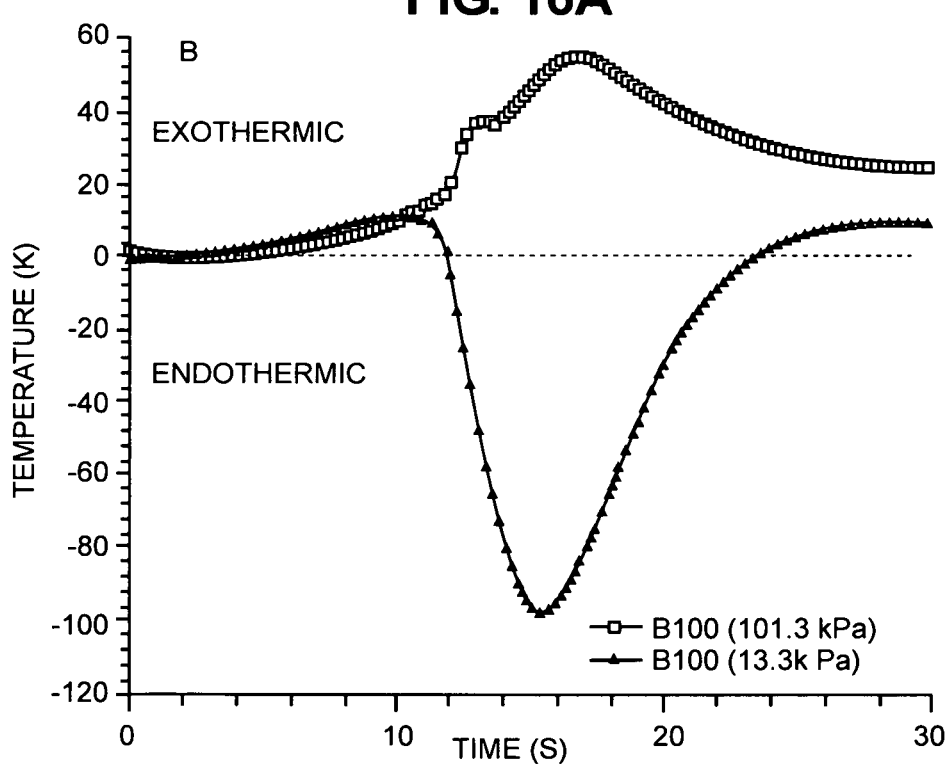
Figure 16C:
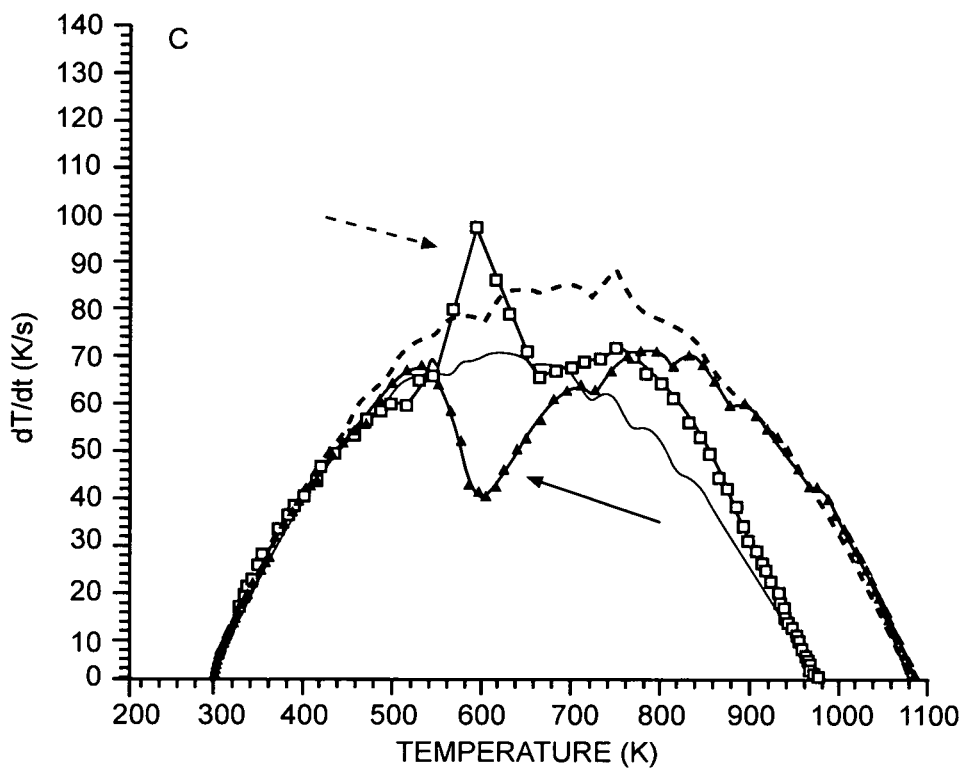
Figure 16D:
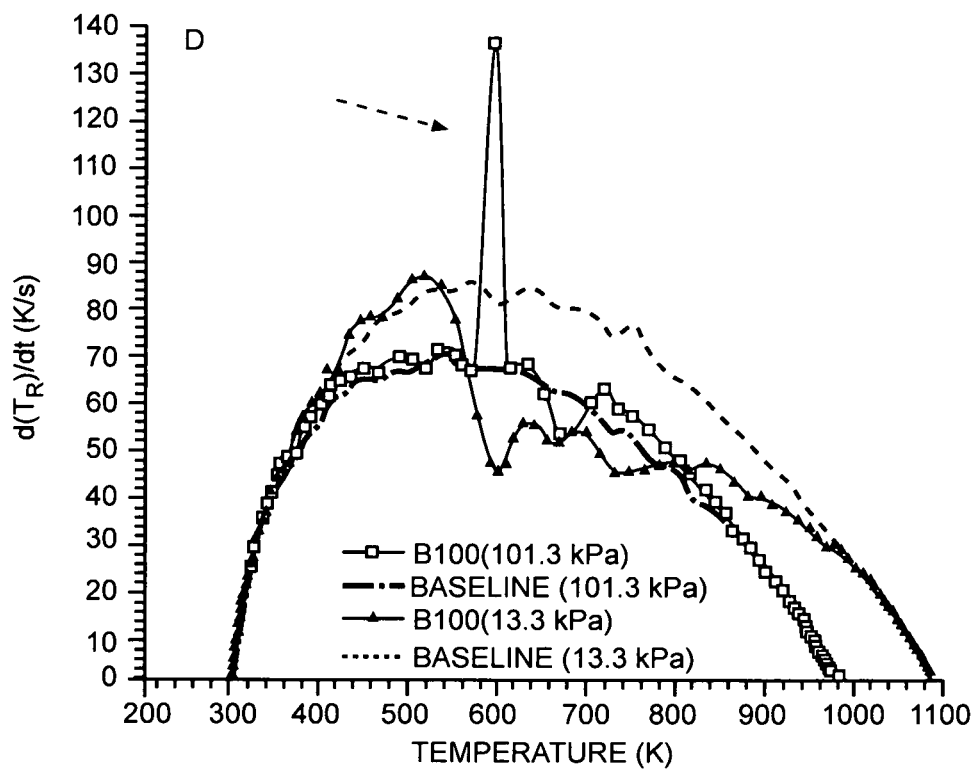

FIG. 16(A) shows a comparison of the sample and the baseline thermograms (sample temperature). FIG. 16(B) shows a comparison of the sample-baseline temperature difference profile (sample temperature). FIG. 16 (C) shows a comparison of the sample and the baseline derivative the RHTR can provide useful information regarding biodiesel fuel thermochemical behavior at different temperatures.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method for reoxidizing a surface of a reactor in a rapid high temperature thermal analysis reactor following its use in testing a sample, said method comprising:
    a) heating the reactor from a starting temperature using laser power in a presence of an oxidizer within a chamber of said reactor;
    b) compiling temperature versus time data simultaneously for the substrate and for the reactor;
    c) using compiled said data to generate new thermograms for the substrate and for the reactor;
    d) cutting-off the laser power when the temperature reaches a predetermined level;
    e) allowing the reactor to cool-off to the starting temperature;
    f) determining new baselines from the new thermograms;
    g) comparing and confirming the new baselines with original reactor baseline thermograms and sample original baseline thermograms;
    h) accepting the new baselines if temperature differences are within 1-1.5%; and
    i) repeating the method from step (a) after each experiment having a chemical reactions.

2. The method of reoxidizing as in claim 1, wherein the heating of the reactor with said laser power is performed at least from opposing sides of the reactor.

3. The method of reoxidizing as in claim 1, wherein the predetermined level depends on a material of the reactor.

4. The method of reoxidizing as in claim 3, wherein for the material being copper the predetermined level is 700-800 deg. K. and the starting temperature is 300 deg.K.

5. The method of reoxidizing as in claim 1, wherein the oxidizer is selected from the group consisting of air and pure oxygen.

6. The method for reoxidizing as in claim 1 wherein the laser heating source consists of one laser that outputs a laser beam via a fiber optic cable as input to a splitter, said splitter having one input and at least two splitter outputs for splitting the laser beam into at least two beams, with each of the at least two splitter outputs connected to one of the at least two laser heads.

7. The method for reoxidizing as in claim 6 wherein each of the at least two beams is directed towards the substrate in the reactor that functions to support at least one sample to be thermally analyzed.

8. The method for reoxidizing as in claim 1 wherein the laser heating source consists of at least two separate lasers, each having one of the at least two laser heads at its output.

9. The method for reoxidizing as in claim 1 wherein the first side area of the reactor and the second side area of the reactor are at opposing sides of the reactor.

10. The method for reoxidizing as in claim 1, wherein the substrate comprises a rotatable substrate configured to support multiple samples.

11. The method for reoxidizing as in claim 10, where a rotation of the rotatable substrate moves one of the multiple samples to a position in a line of sight of a laser beam such that the laser beam is focused only on that one sample.

\* \* \* \* \*